United States Patent
Dobbek et al.

(10) Patent No.: US 6,522,493 B1
(45) Date of Patent: Feb. 18, 2003

(54) POSITION ERROR SIGNAL LINEARIZATION USING AN AUXILIARY DISCONTINUITY REMOVAL ROUTINE

(75) Inventors: Jeff J. Dobbek, San Jose, CA (US); Gregory Michael Frees, Los Altos, CA (US); Craig N. Fukushima, Monte Sereno, CA (US); Louis Joseph Serrano, San Jose, CA (US); Markus Staudenmann, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,071

(22) Filed: Apr. 27, 1999

(51) Int. Cl.⁷ .............................................. G11B 21/02
(52) U.S. Cl. ...................... 360/75; 360/77.08
(58) Field of Search ........................ 360/77.04, 77.08, 360/78.04, 39

(56) References Cited

U.S. PATENT DOCUMENTS

| | | |
|---|---|---|
| 3,691,543 A | 9/1972 | Mueller |
| 4,578,723 A | 3/1986 | Betts et al. |
| 5,010,535 A | 4/1991 | Davis |
| 5,072,318 A | 12/1991 | Yu |
| 5,117,408 A | 5/1992 | Weispfenning et al. |
| 5,241,433 A | 8/1993 | Anderson et al. |
| 5,274,511 A | 12/1993 | Ikeda |
| 5,576,909 A | 11/1996 | Dierkes et al. |
| 5,585,976 A | 12/1996 | Pham |
| 5,668,679 A | 9/1997 | Swearingen et al. |
| 5,687,038 A | 11/1997 | Sugawara et al. |
| 5,771,131 A | 6/1998 | Pirzadeh |
| 5,774,298 A | 6/1998 | Cheung et al. |
| 5,793,559 A | 8/1998 | Shepherd et al. |
| 5,818,659 A | 10/1998 | Cheung et al. |
| 5,825,579 A * | 10/1998 | Cheung et al. .......... 360/77.08 |
| 5,859,742 A | 1/1999 | Takaishi |
| 5,867,341 A | 2/1999 | Volz et al. |
| 5,867,353 A | 2/1999 | Valent |
| 5,946,158 A * | 8/1999 | Nazarian et al. ......... 360/77.04 |
| 5,982,173 A * | 11/1999 | Hagen ........................ 324/212 |

* cited by examiner

Primary Examiner—David Hudspeth
Assistant Examiner—K. Wong
(74) Attorney, Agent, or Firm—Gates & Cooper LLP

(57) ABSTRACT

A method, apparatus, and article of manufacture for determining a transducer position in relation to a media surface is described. The method comprises sensing positioning information on the media, measuring a position error signal from the sensed positioning information wherein the position error signal includes first and second position signal components, accessing stored information describing a non-linear relationship between the measured position error signal and the transducer position, and applying the stored relationship to the measured position error signal to produce a corrected position error signal, and determining the transducer position from the corrected position error signal.

30 Claims, 23 Drawing Sheets

Normalized P and Q Useful Section Only $$P = \frac{|PESP\ nom| + |PESQ\ nom|}{|PESP| + |PESQ|};$$

$$Q = \frac{|PESP\ nom| + |PESQ\ nom|}{|PESP| + |PESQ|}$$

Normalized P and Q Useful Section Only $$P = \frac{|PESQ\ nom|}{|PESQ|} \ ;$$

$$Q = \frac{|PESP\ nom|}{|PESP|}$$

POSITION ERROR SIGNAL LINEARIZATION USING AN AUXILIARY DISCONTINUITY REMOVAL ROUTINE

CROSS-REFERENCE TO RELATED APPLICATIONS

This application is related to the following co-pending and commonly assigned patent applications, which are hereby incorporated by reference herein:

Application Ser. No. 09/299,893 entitled "POSITION ERROR SIGNAL CALIBRATION USING MEASURED BURSTS," by Jeff J. Dobbek, Blake Finstad, Gregory M. Frees, Craig N. Fukushima, and Louis J. Serrano, filed on Apr. 27, 1999, now U.S. Pat. No. 6,429,995, issued on Aug. 6, 2002, attorney's docket number SA9-99-078; and Application Ser. No. 09/300,026, entitled "LINEARITY COMPENSATION FOR A POSITION ERROR SIGNAL BASED ON REPEATABLE AND NON-REPEATABLE RUN OUT IN A DISK DRIVE," by Bernd Lamberts, Louis J. Serrano, and Mantle Man-Hon Yu, filed on Apr. 27, 1999, now U.S. Pat. No. 6,421,198, issued on Jul. 16, 2002, attorney's docket number SA9-99-047.

BACKGROUND OF THE INVENTION

1. Field of the Invention

The present invention relates to actuator servo control systems used in precision positioning of read/write transducers in data storage devices such as hard drives, and in particular to a system and method for linearizing a position error signal to reduce errors.

2. Description of the Related Art

Disk and tape data storage devices are well known in the art. The data is stored as a plurality of data tracks of predetermined format disposed on a recording medium such as a magnetic disk, an optical disk, or magnetic tape. The data is written to and read from the tracks using one or more transducers or read/write heads, which are electrically coupled to signal processing electronics to provide a data transfer path between the media and a requesting system external to the storage device.

The heads are supported in close proximity to the media by a head positioning assembly capable of operating in two distinct modes: track seeking and track following. During track seeking, the heads are moved transversely to the tracks from a current data track to a desired or target track in response to a read or write request from the external system. Track following is the function of maintaining a head in alignment with a track while reading, writing, or merely idling.

In most storage devices, movement of the head positioning assembly is controlled by a closed loop servo system comprising a combination of servo electronics and microcode. Closed loop systems utilize position information obtained from the surface of the storage medium as feedback to perform the seeking and track following functions. Examples of a closed loop servo control system are provided in commonly assigned U.S. Pat. Nos. 4,679,103 and 5,404,254. Some disk drive designs hold servo information on a single, dedicated disk surface (i.e., dedicated servo). Other disk drive designs, and most tape drives, provide servo information embedded between the data regions of the storage media (i.e., embedded servo) in the form of a PES field. The PES field is written using an external positioning device known as a pusher or a servowriter, and read with a magnetoresistive read element. Unfortunately, because of manufacturing tolerances, the read and writing elements can vary in width, which can cause the sensed head position to vary non-linearly with the actual head position.

Servo information typically includes a track identifier and a burst pattern which are combined to produce a position signal. The track identifier is commonly in the form of a grey code or track address and is used to uniquely identify the track currently beneath the transducer. The burst pattern produces an analog signal indicative of track type and head offset with respect to the center of the current track. If a quadrature burst pattern is used, the resulting analog signal is demodulated into primary (PESP) and quadrature (PESQ) signals. When the head moves transversely to the tracks during a seek operation, the track identifier and quadrature contributions are combined or "stitched" together to ideally provide a linear position signal.

As storage devices move toward greater track densities, the accuracy of the position signal becomes increasingly important for enabling data storage and retrieval, particularly when using magnetoresistive (MR) heads. MR heads comprise a magnetoresistive read element in combination with an inductive write element. Manufacturing tolerances in the production of MR heads typically causes an offset between the respective centers of the read and write heads which results, on occasion, in the read head servoing at or near the stitch points of the position signal. This is necessary to center the read head to an offset position aligned with the radial position where data has been written. Discontinuities at these junctures may cause relatively large changes in the position signal for very small read head movement, resulting in erratic actuator movement.

Unfortunately, the position signal often includes discontinuities at the stitch points due to PES gain variation. Gain variation is attributable to such factors as write width modulation, servowriter runout, transducer fly height, variations in head width, and gain errors introduced by the automatic gain control (AGC) process itself.

One approach for correcting nonlinearity of the position signal is to include a gain adjustment stage prior to the servo control loop. For example, commonly owned U.S. Pat. No. 4,578,723 addresses nonlinearities in the slope of the position signal in a disk drive due to variations in electromagnetic read head widths. The reference discusses a number of techniques for controlling the AGC output gain. One technique uses the sum (p+q) of contributions from a pair of servo tracks to normalize the position error signal, since this sum corresponds to the full head width and is therefore a constant quantity. (The p+q sum referred to in this reference is equivalent to the sum of A+C in a quadrature burst environment, i.e., the sum of the contributions from bursts positioned to either side of the center of a data track.) The position error signal (which is comparable to PESP in a quadrature environment) is given by $(p-q)/(p+q)$ multiplied by a constant. The problem with this approach is that although it provides some standardization of gain, it does not correct for nonlinearity, errors in the slope of the position error signal or discontinuity at the stitch points of the final position signal.

A second approach discussed in the reference is to add a calibration step at the output of the AGC loop to bring the AGC gain within a predetermined acceptable range. However, this approach also fails to correct for nonlinearities and tends to only be nominally effective at the stitch points.

Another technique proposed by the reference is to include a gain function generating means in the AGC loop to provide, at any radial position of the head, a gain function which is a measurement of the rate of change (i.e. slope) of the position error signals per track of displacement. The gain control loop controls a variable gain amplifier in dependence on the gain function so as to keep the measured rate of change substantially constant. While this approach works on average on a sector-by-sector basis, it leaves open the possibility to discontinuities at the stitch points.

Still another technique is discussed in commonly owned U.S. Pat. No. 5,825,579, issued to Cheung et al, which is hereby incorporated by reference herein. This reference discusses the use of a normalization stage applied to a servo control loop to provide continuity at stitch points. However, while this normalization can reduce discontinuities, it does not improve and will typically increase PES non-linearities near zero track points.

What is needed, therefore, is a system and method for linearizing the PES signal for use in positioning a transducer relative to a storage media surface. What is further needed is for such system and method to be operable with normalization techniques to provide a continuous stitched position signal.

SUMMARY OF THE INVENTION

To address the requirements described above, the present invention discloses a method, apparatus, and an article of manufacture for determining a transducer position in relation to a media surface.

In one embodiment, the invention is embodied in a method comprising the steps of sensing positioning information on the media, measuring a position error signal from the sensed positioning information wherein the position error signal includes first and second position signal components, accessing stored information describing a non-linear relationship between the measured position error signal and the transducer position, and applying the stored relationship to the measured position error signal to produce a corrected position error signal, and determining the transducer position from the corrected position error signal. The invention is also embodied in an apparatus comprising means for performing the operations described above, and a program storage device tangibly embodying instructions for performing the method steps described above.

As described herein, the foregoing allows the transducer position to be determined based on calibrated PES signal measurements, and allows these calibrated measurements to be used along with auxiliary linearization schemes.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

The present invention provides a system and method for the accurate positioning of an actuator in a storage device.

Figure 1:
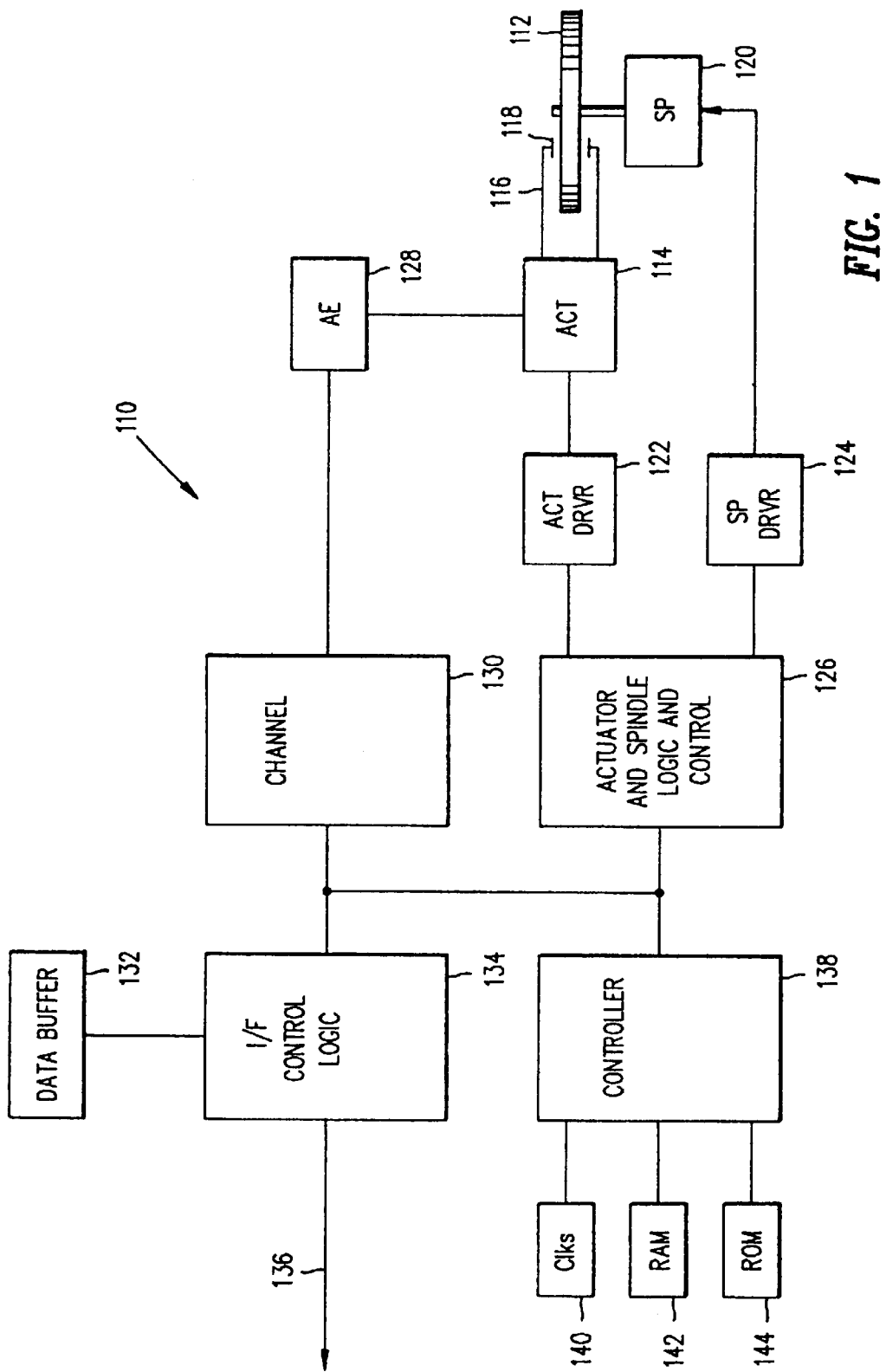
FIG. 1 is a block diagram of a magnetic disk drive suitable for implementing the present invention.

FIG. 1 illustrates the preferred storage system for practicing the present invention. To facilitate the reader's understanding, the preferred embodiment is described in the context of a magnetic storage device having a rotating media and a transducer positionable in a substantially radial direction. However, it shall be understood that the present invention is readily adaptable to other types of storage devices, including optical storage devices and tape drives with transversely positionable heads relative to the data tracks of the recording media.

The disk drive system 110 of FIG. 1 stores information on the surfaces of one or more stacked magnetic disks 112 in the form of magnetic transitions or patterns formed on a plurality of concentric data tracks. The disks are rotatably mounted on a spindle motor 120, and rotation of the motor is driven by a spindle motor driver 124. The magnetic transitions are sensed or "read" from the disk 112 via one or more transducers 118 supported in close proximity to the disk surfaces. The transducer converts the patterns into an electrical signal, which is provided to a data channel 130. The data channel may comprise a partial response, maximum likelihood (PRML) channel, for example.

The transducers are positioned over the disk surfaces by a rotary actuator assembly 114 comprising a voice coil motor (VCM) and a positionable block of one or more actuator arms supporting the transducer(s) on flexible suspension(s) 116. The VCM is driven by actuator driver circuit 122. Control of the actuator and spindle motor driver circuits 122, 124 is provided by actuator and spindle control logic 126 that preferably includes a digital signal processor for carrying out the various operations of the actuator and spindle motor servo control loops.

The write path of the disk drive 110 comprises interface control logic 134 and data buffer 132 for receiving data and commands from the host, a write path within the read/write channel 130 for processing the data prior to writing, and a write transducer 118 for writing the modulated signal to the disk 112. The read path, conversely, comprises a read transducer 118 for sensing data from the disk 112, arm electronics 128 on the actuator for preamplifying the read signal, a read path within channel 130 for processing the amplified signal, and a read path within the interface control logic 134 for transmitting the read data from the file in a form recognizable to the device requesting the data. In the preferred embodiment, the read/write channel also includes servo detection logic for detecting position information written on one or more of the disks 112. The specific functions of the read and write data path elements are well understood by skilled artisans and as such, will not be discussed in further detail.

Master control over the various functions of the disk drive is exercised by a controller 138, which preferably comprises a microprocessor embedded with additional support functions (e.g., counters, an interrupt controller, a direct memory access (DMA) controller, a serial interface controller, and other functions generally known to assist microprocessor control functions). The controller is normally associated with a predetermined amount of read-only-type memory (ROM) 144 for storing a microcode control program; RAM 142; and a reference clock 140. The controller 138 directly oversees operation of the interface control logic 134, the data channel 130, and actuator and spindle control 126 in a manner generally understood in the art.

Figure 2:
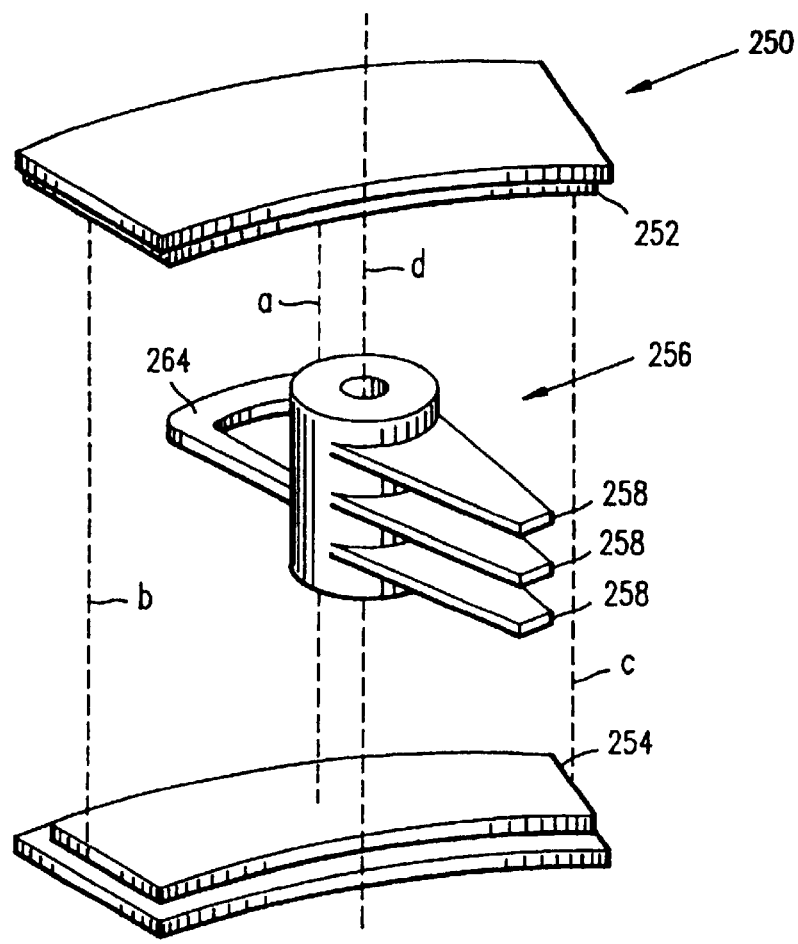
FIG. 2 is an exploded perspective view of a rotary actuator assembly suitable for implementation of the present invention.

FIG. 2 shows a rotary actuator assembly suitable for use in the disk drive of FIG. 1 and for control by the servo control system and method of the present invention. It shall be understood that the actuator of FIG. 2 is provided for illustration purposes only, and that the present invention may be implemented to control a wide variety of actuator assembly designs, including linear actuators, provided that the movement of the actuator is in response to a control signal. The assembly 250 has an arm structure 256 disposed between a pair of permanent magnets 252, 254. The magnets are affixed to opposing walls of the disk drive enclosure (not shown), and generate a magnetic field therebetween. The magnetic field is strongest along a central axis a, and weakest at the outer fringes, as represented generally by axes b and c. The arm structure 256 includes a plurality of arms 258 extending in a first direction and a voice coil 264 extending in the opposite direction. The coil 264 receives a control current from a power amplifier (not shown) and in response, generates a magnetic flux. The magnetic flux interacts with the permanent magnet field to produce a moving force upon the actuator structure 256, causing it to rotate about a pivotal axis d. The range of movement of the coil 264 lies in a plane substantially parallel to the planes of the magnets, and is restricted to the magnetic field by crash stops (not shown) disposed proximate to the outer boundaries of the permanent magnet field. The propulsion means of the assembly, i.e. the coil 264 and permanent magnets 252, 254 constitute a voice coil motor (VCM).

Figure 3:
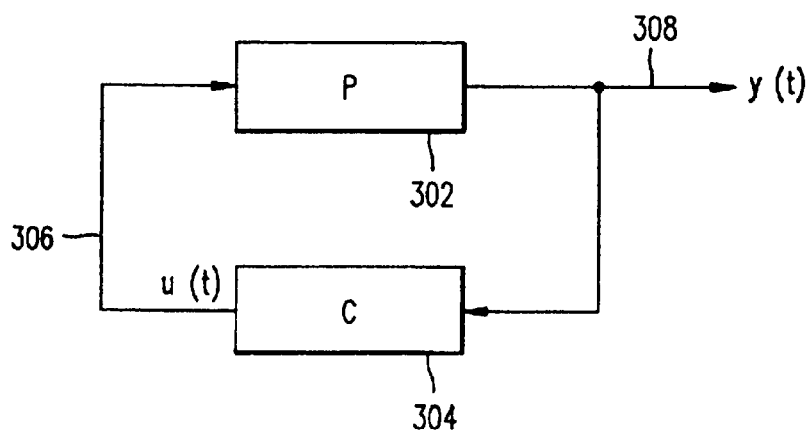
FIG. 3 is a simplified block diagram of a closed loop servo control system.

Referring now to FIG. 3, a servo control system is shown in block diagram form, including a plant 302 consisting of the actuator assembly 312, driver electronics 310, and signal detection electronics 314; and a controller 304, consisting of servo electronics and microcode. As shown in FIG. 3, the input to the plant 302 is a control signal u(t) 306 commanding the amount of current provided to the voice coil. The output from the plant 302 is a position signal, y(t) 308, typically comprising a combination of track type, track identifier or grey code, and position error signal (PES), for reporting the actuator position with respect to the disk surface. A more detailed description of the manner in which the position signal is generated will be described subsequently.

The controller 304 is arranged in a feedback path to the plant 302. Its inputs are the position signal output from the plant 302, and positioning information provided in commands received from a requesting device. The output of the controller is the control signal u(t) 306 that is input to the plant 302. In general, the purpose of the feedback path is to adjust the control signal u(t) 306 to account for deviations in actual performance versus nominal performance so that the actuator more closely follows an expected nominal behavior representative of a population of disk drives of the same design. The accuracy of u(t) depends both upon the accuracy of the position signal provided from the plant, and the accuracy with which the servo system models the actuator behavior. The present invention focuses upon the former.

Figure 4A:
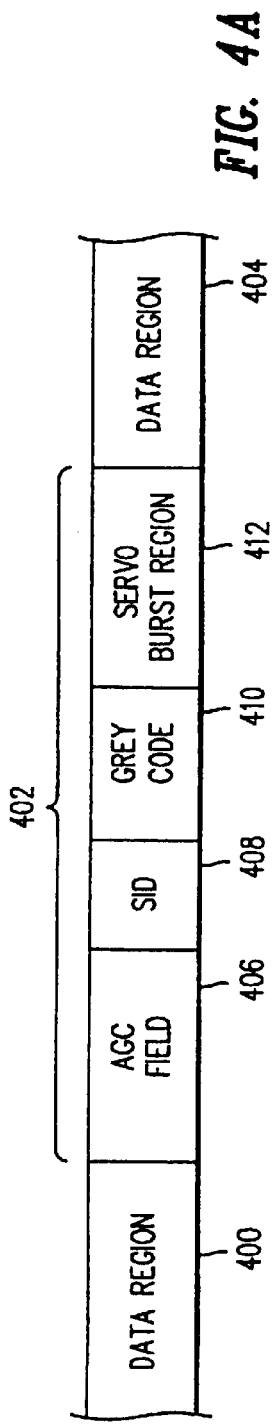
FIG. 4A is an example of a servo sector format suitable for practicing the present invention.

The position information used by the closed loop system of FIG. 3 is preferably obtained from servo information stored on the surface of the recording media. For example, in a sectored servo disk drive, the track identifier and PES are obtained from servo information embedded on each disk between data regions. An example of a servo sector 402 embedded between data regions 400 and 404 is shown in FIG. 4A. The servo sector 402 comprises a synchronization or AGC field 406, a sector identification mark (SID) 408, a track identifier or grey code 410, and a servo burst region 412. The AGC field 406 typically comprises a repeating synchronization pattern, and is used to adjust the servo detection logic to the amplitude and phase of the servo information to follow. The track identifier or grey code field 410 includes a numerical value for uniquely identifying the current track and servo sector 402. The grey code comprises, for example, an encoded three bit binary number that varies by only one bit with respect to grey codes of adjacent tracks. This field also or alternatively includes track identifying information such as the cylinder, head and sector numbers corresponding to the particular servo sector. The grey code field is followed by a servo burst region 412, preferably of the quadrature burst type. Although a sectored servo track format is shown for purposes of illustration, it shall be understood that the present invention is readily adaptable to dedicated servo architectures.

Figure 4B:
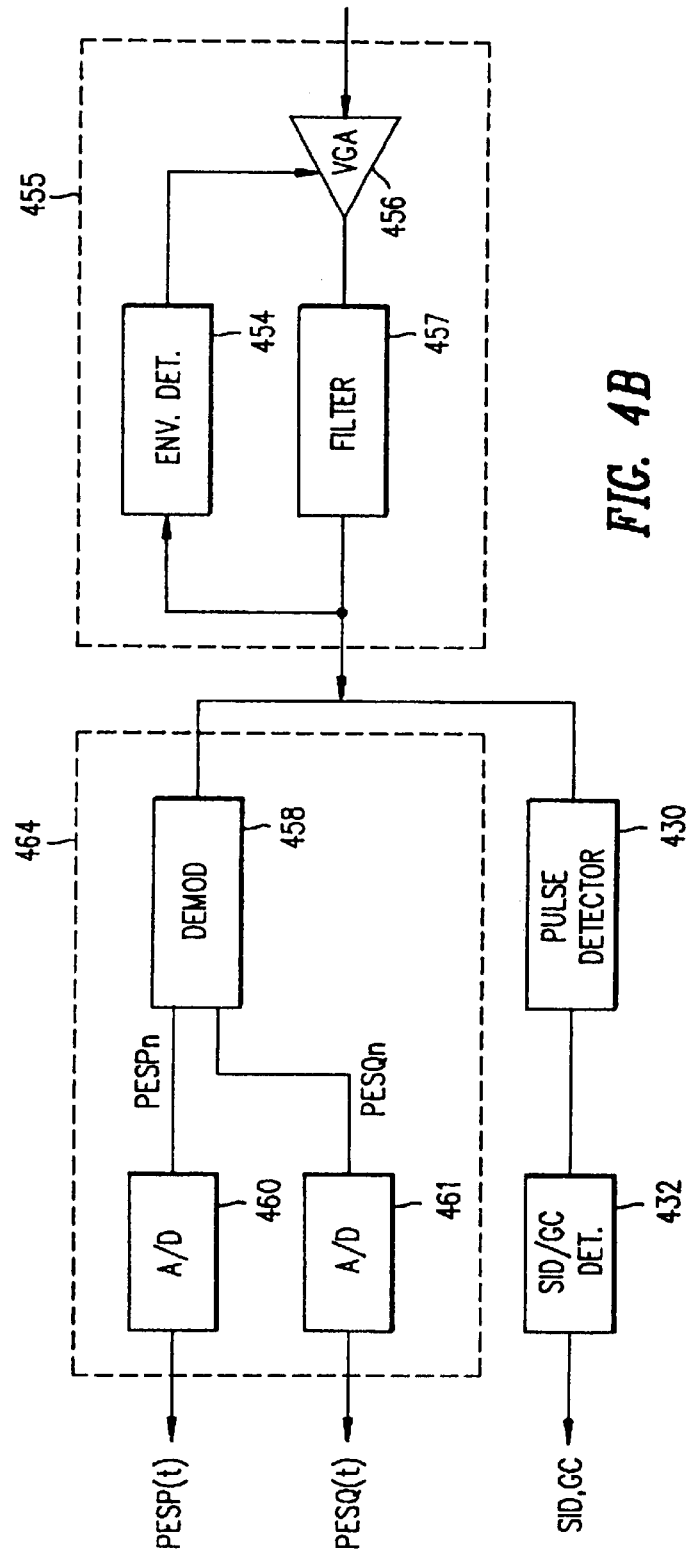
FIG. 4B is a block diagram of servo detection logic suitable for implementing the present invention.

Conversion of the servo information into a position signal for use by the servo control loop involves a number of stages, including both hardware and software operations. In a first stage, the servo information is sensed and processed by servo detection logic in the read/write channel 130. The servo detection logic of the preferred disk drive embodiment is shown in FIG. 4B. A transducer (not shown) senses the information from the disk surface and transduces it into an electrical signal, which is provided to an AGC circuit 455. The AGC circuit comprises, for example, a variable gain amplifier 456, a filter 457, and a feedback path comprising an envelope detector 454. The AGC circuit 455 uses the amplitude of the repeating pattern in the AGC field 406 to tune the VGA 456 so that the AGC output signal has a predetermined nominal amplitude. The amount of gain required will be dependent, for example, on the characteristics of the read transducer and the transducer fly height. AGC circuits are well-known in the art, and as such will not be explained in further detail.

The output of the AGC circuit 455 is coupled to a pulse detector 430 and a demodulating circuit 464. The pulse detector synchronizes to the phase of the AGC field 406 pattern and produces binary pulses indicative of the SID and grey code fields 408, 410. These pulses are provided to a SID/grey code detector 432 in the controller 138 for detection and subsequent use in producing the position signal.

The demodulating circuit 464 comprises, for example, a demodulator 458 and a pair of A/D converters 460, 461 coupled to the demodulator 458 outputs. The outputs of A/D converters 460, 461 are coupled to the disk drive controller 138 (not shown in FIG. 4B). The demodulator 458 receives an analog signal obtained from the servo burst region 412 and demodulates it into primary and quadrature analog signals, PESP and PESQ. Briefly, PESP and PESQ are position error signals indicative of the read transducer's alignment at a sample time, t, to the current track. These signals will be discussed in further detail below. The demodulated signals are then digitized by A/D converters 460, 461 to generate digital position error signals, PESP(t) and PESQ(t), where t represents a sample time.

The specific steps for generating a position signal from the embedded servo information will now be described with reference to FIG. 5. A grey code region 410 is shown including four grey code tracks, each having a value as designated by the labels GC0–GC3. Numerous grey code encoding schemes are used in the art, and the particular encoding scheme used is not considered pertinent to the present invention, provided that whichever grey code or track identifying information is used, it will in some way enable identification of absolute track position. Grey code track width is indicated by the arrows 502.

Adjacent to the grey code region 410 is the servo burst area 412. Two complete sets of radially disposed, analog quadrature burst patterns are shown with portions of other sets. It will be appreciated that while the preferred embodiment is described for a disk drive employing quadrature burst servo patterns, the present invention is also applicable to disk drives having other types of position information patterns, since the present invention provides a benefit to any servo positioning system that requires stitching of position pattern signals.

Each quadrature burst pattern comprises a group of four radially offset bursts, A–D, 504, 506, 508, 510 and 503, 505, 507, 509. In the present example, bursts of the same group are radially offset by half of a grey code track width 502. For example, the upper edge of burst B 506 is transversely offset from the upper edge of burst A 504 by a half track width. In addition, each group of servo bursts is radially offset from the other groups by two grey code track widths 502. For example, the upper edge of burst A 504 and the upper edge of burst A 503 are radially offset by grey code tracks GC0 and GC1.

As a read transducer passes over the servo burst region 412, it senses the amplitudes of the nearest servo bursts and provides a composite, analog amplitude signal to the AGC circuit 455 of the servo detection logic. The demodulator 458 receives the amplified signal and generates two separate waveforms: a primary signal (PESP) 520 and a quadrature signal (PESQ) 522, as shown in column 516. These signals are then calibrated (described below). The waveforms are functions of the transverse or radial head position relative to the bursts. For the present example, $$PESP = A - C, \quad (1)$$

and $$PESQ = B - D, \quad (2)$$

where A, B, C and D represent the sensed amplitudes of bursts A–D. Thus, the PESP signal 520 will ideally have a zero value whenever the read transducer is radially positioned between any two adjacent A and C bursts, e.g. along line 512 as indicated by the corresponding zero crossing point 524. Each A=C point aligns with a grey code track boundary. The signal will ideally have a maximum value whenever the read head is positioned at the center of an A burst (e.g. point 526 corresponding to A burst 503) and a minimum value when the read head is positioned at the center of a C burst (e.g., point 528 corresponding to C burst 508). Each maximum or minimum PESP value corresponds to a center of a grey code track, as indicated, for example, by line 514. The PESQ signal 522, in contrast, will ideally have a zero value at each grey code track center (e.g., point 530 along line 514), i.e., whenever the read transducer is radially positioned between any two B and D bursts. The signal will ideally have a maximum or minimum value whenever the read head is positioned on a grey code track boundary (e.g., points 532 and 534).

The PESP and PESQ waveforms, 520, 522, are provided to the A/D converters 460, 461. The digitized output values from the converters are represented as PESP(t) and PESQ(t) for a sample time t, and are used by the controller 138 to determine the current track type, e.g., according to the following algorithm.

IF {PESP(t)>PESQ(t)},
   THEN IF {PESP(t)<−PESQ(t)}, THEN the track type is zero and PESP(t) will be used;
   ELSE IF {PESP(t)>−PESQ(t)}, THEN the track type is one and PESQ(t) will be used;
IF {PESP(t)<PESQ(t)}, THEN IF {PESP(t)>−PESQ(t)}, THEN the track type is two and −PESP(t) will be used;

ELSE IF {PESP(t)<−PESQ(t)}, THEN the track type is three and −PESQ(t) will be used.

For any radial position, the track type determines whether the PESP(t) or the PESQ(t) signal (or their inverted signals, −PESP(t) and −PESQ(t)) will be used to generate the position error signal (PES) portion of the position signal output from the servo control loop. There are four track types according to the present example.

Figure 5:
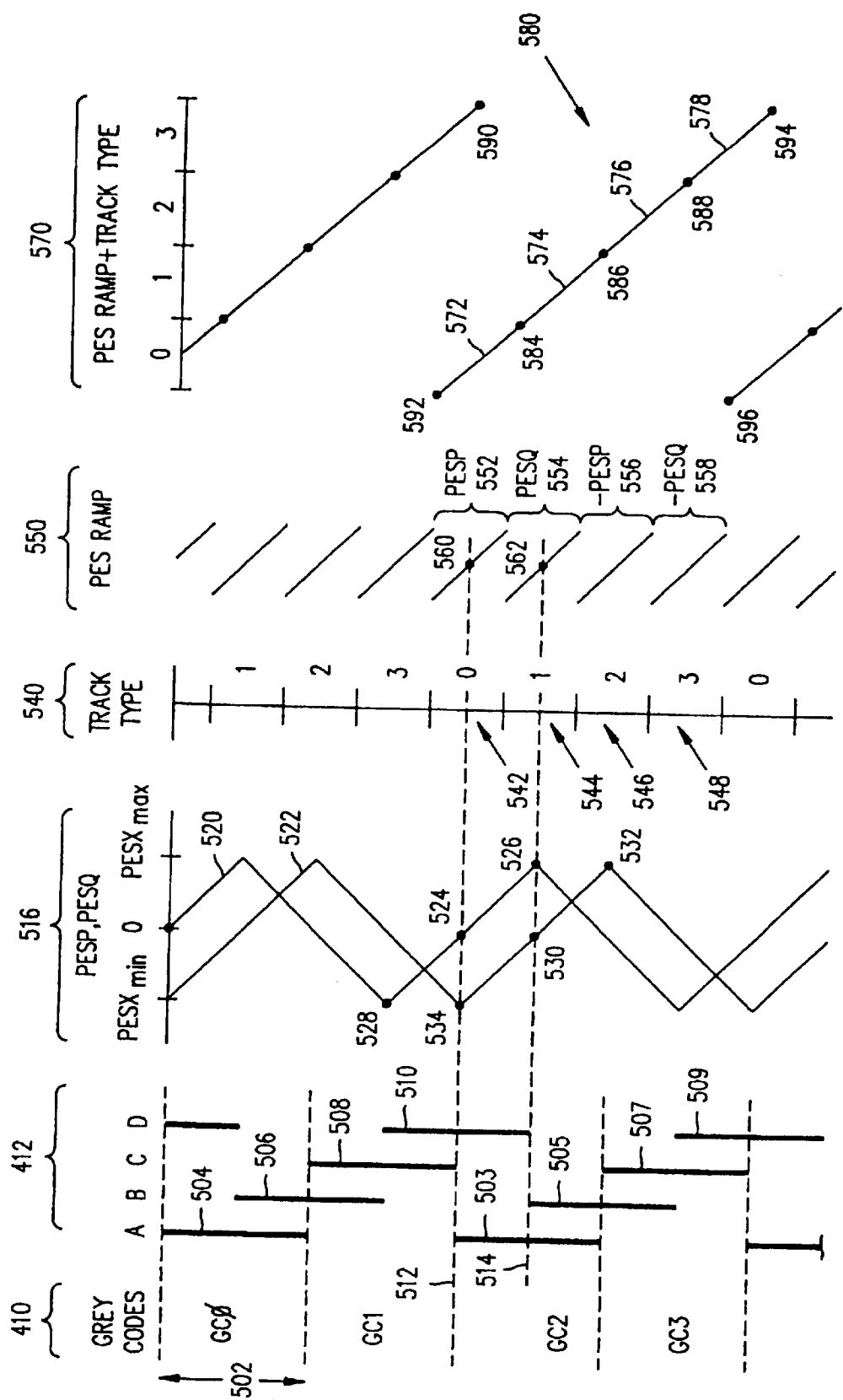
FIG. 5 illustrates the general steps involved in generating a stitched position signal from a quadrature burst pattern, as is suitable for practicing the present invention.

Column 540 of FIG. 5 shows the relationship of the track types to the PESP and PESQ curves 520, 522. As should be apparent from the above algorithm, each zero track type is defined to have a center at a zero crossing point of the PESP curve 520 when its slope is positive. For example, zero-type track 542 corresponds to zero crossing point 524, which is located along a rising segment of the PESP curve 520. Similarly, each type one track is centered at the zero crossing point of a positively sloping portion of the PESQ curve (e.g. type-one track 544 corresponding to zero crossing point 530 on a rising segment of the curve). Track types two and three are the inverses of types zero and one. That is, their centers correspond to zero crossings along the negatively sloping portions of the PESP and PESQ curves 520, 522, respectively (e.g. tracks 546 and 548). Conversely, types two and three corresponding to zero crossings along the positively rising segments of the −PESP and −PESQ curves (not shown).

The position signal is a composite signal formed by stitching together segments of the PESP, PESQ, −PESP and −PESQ curves as determined by track type. For example, when a read head is positioned over the servo bursts within the range zero track type 542, the position signal contribution 552 is obtained from the PESP curve 520. As the head moves into the respective ranges of the type one, type two, and type three tracks 544, 546, 548, the position signal contributions 554, 556, 558 are obtained from the PESQ, −PESP, and −PESQ curves, respectively. In the present example, each segment ideally has maximum and minimum values of +0.25 and −0.25 grey code track widths.

The various contributions are then stitched together at their endpoints to form an ideally linear position signal. Stitching is performed by adding successively increasing vertical offsets, TT0off, TT1off, TT2off and TT3off to each PES contribution as determined by track types. For the specific example provided, TT0off=0, TT1off=0.5, TT2off= 1.0, and TT3off=1.5, where these offsets are in terms of grey code track widths. These offsets are added to contributions 552, 554, 556 and 558 to obtain stitched segments 572, 574, 576 and 578 and form a larger segment 580. The larger segments obtained from the described stitching process may them be further stitched at their respective endpoints by adding another offset to each stitched segment. The offset in this case is ideally determined by the absolute track address. It may be obtained from the track identifier in the track ID field or fields, or by processing of the grey code signal. For example, endpoints 590 and 592 would be stitched together, as would endpoints 594 and 596, thus ideally forming a continuous, linear position signal (not shown).

While the foregoing servo system is effective, it is subject to errors. One source of such errors is irregularities in the quad burst pattern used in the PES field. There are several techniques for writing a quad burst pattern. The seamless technique, the four constant frequency bursts are written in a single pass. In a seamed technique, each pulse requires two passes to write, requiring that the flux transitions of the separate passes be closely aligned. In either technique, the trailing edge of the frequency bursts can be erased or trimmed to assure that the extent of each burst is the proper value. Typically, the quad burst pattern written is written seamlessly and untrimmed.

Figure 6A:
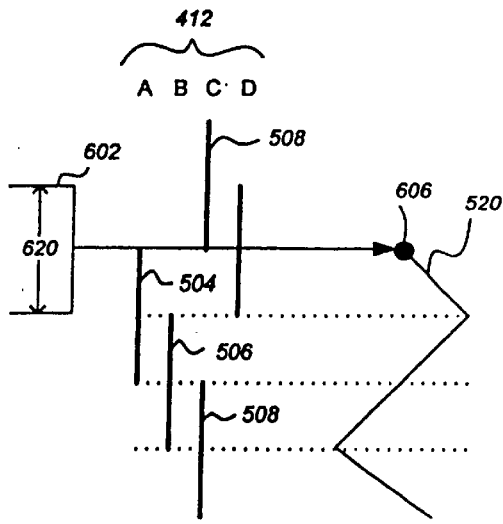
FIGS. 6A–6D are diagrams showing a relationship between the read transducer position and the PESP signal for a read head transducer with the same effective width as the transducer used to write the servo bursts.
Figure 6B:
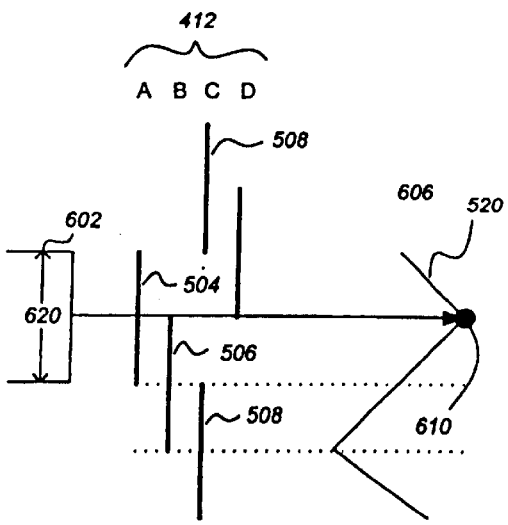
Figure 6C:
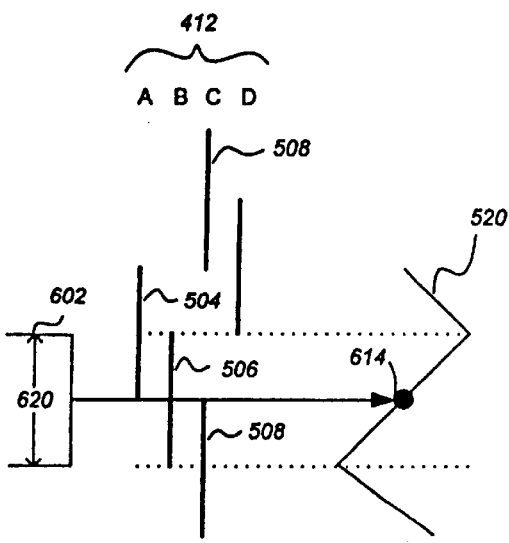
Figure 6D:
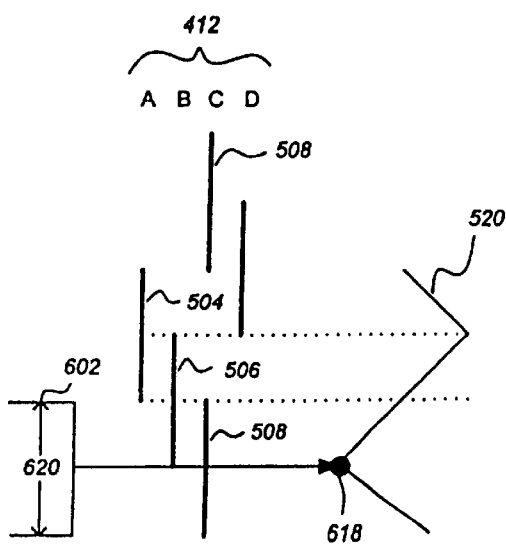

FIGS. 6A–6D are diagrams showing the relationship between the read head position and the PESP signal 520 for a read head/read transducer 602 with the same effective width 620 as the transducer used to write the servo bursts 504, 506 and 508 in the burst region 412. When the read transducer 602 is in the first position shown in FIG. 6A, the read transducer reads both the A burst 504 and the C burst 508 in the same amount, and hence, the PESP signal (e.g. A−C is at zero 606), as shown in FIG. 6A. As the head moves to the second position depicted in FIG. 6B, the contribution of the C burst 508 becomes less and the contribution of the A burst 504 becomes more, and the PESP signal 520 becomes larger, reaching its peak when the read transducer 602 is centered over the A burst 504. As the read transducer 602 moves to the third position depicted in FIG. 6C, the contribution of the A burst 504 to the PESP signal is reduced, and the contribution of the C burst 508 becomes greater, until they are again equal, and the PESP 520 signal crosses zero point 614. Eventually, when the read transducer reaches the fourth position shown in FIG. 6D, the contribution from the A burst 504 is zero, and the contribution from the C burst 508 is at a maximum, and the PESP signal 520 reaches its minimum 618.

Figure 7A:
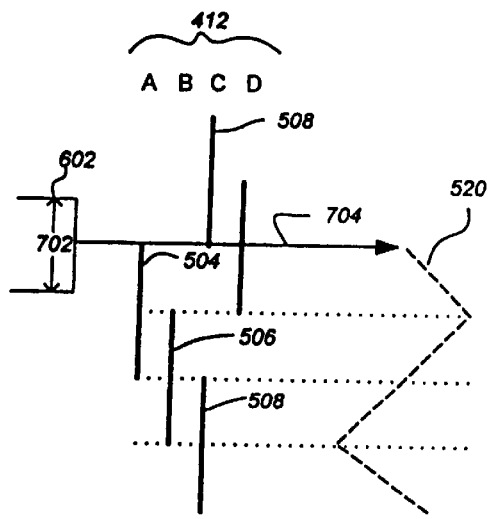
FIGS. 7A–7D are diagrams showing a relationship between the read transducer position and the PESP signal for a read head transducer with a narrower effective width than the transducer used to write the servo bursts.
Figure 7B:
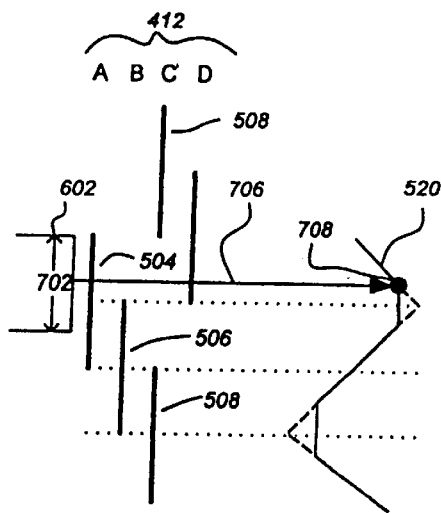
Figure 7C:
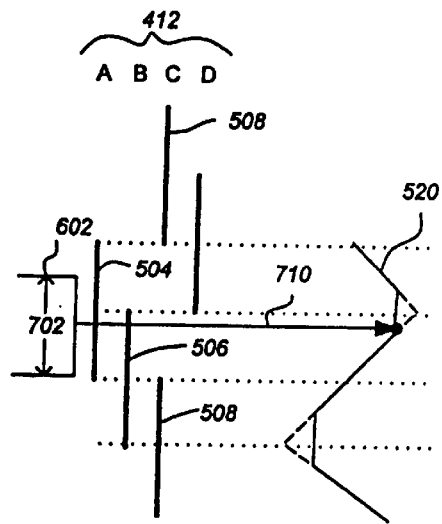
Figure 7D:
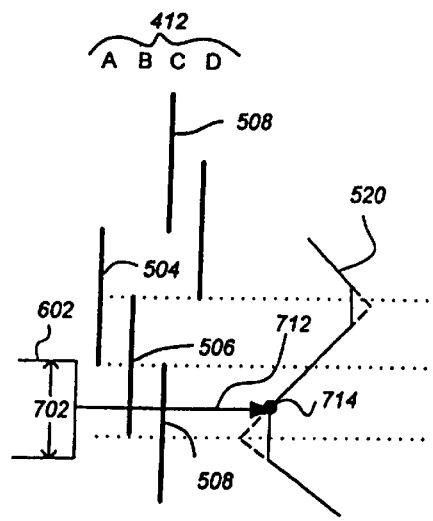

FIGS. 7A–D are diagrams showing the relationship between the read transducer position and the PESP signal 520 for a read head transducer 602 which has an effective width 702 which is less than the effective width of the write transducer used to generate the servo bursts 504, 506, and 508. FIG. 7A shows that when the read transducer 602 is centered between the A burst 504 and the C burst 508, the PESP signal is zero, as with the ideal case depicted in FIG. 6A. However, as shown in FIG. 7B, the output of the read transducer 602 reaches its maximum value at a second position, causing the PESP signal 520 to reach a plateau value 708 less than the peak value 610. The PESP signal 520 remains at this value until the read transducer reaches third position, where it begins to sense some of the C burst 508. Hence, from this point, the PESP signal 520 drops from the plateau 708, as shown in FIG. 7C. The PESP signal 520 continues to decrease until it reaches a fourth position shown in FIG. 7D, where it has a minimum plateau value 714. Hence, when the effective width of the read transducer is narrow, non-linearities in the PESP signal can result. These non-linearities manifest themselves in the PES signal as well.

Read transducer sensitivity non-linearities also contribute to non-ideal PESP signal 520 waveforms. In the examples discussed in reference to FIGS. 6 and 7, the read transducer 602 was assumed to have a linear sensitivity across its entire width. However, actual read transducers 602 do not exhibit this characteristic. Instead, they are typically more sensitive in the region near the center of the read transducer 602, and less sensitive at the edges of the effective width. Further, as described in U.S. Pat. No. 5,825,579, the read transducer is also subject to errors induced by the trapezoidal geometry of the transducer and the geometry of the actuator arm and storage media. These read head sensitivity and geometry characteristics can combine with the effects from the read head transducer width to further impact the accuracy of the PESP signal.

Figure 8:
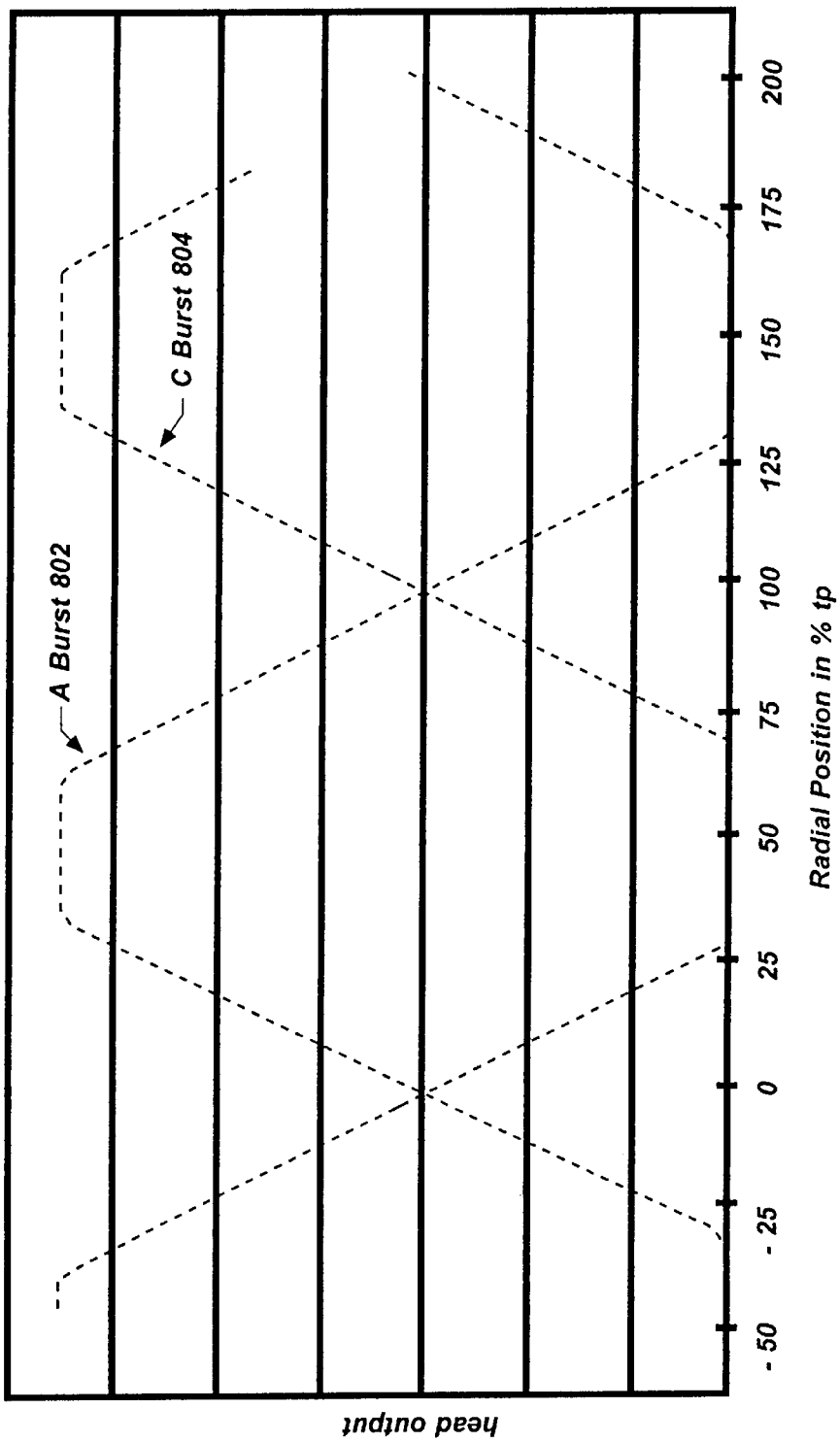
FIG. 8 is a diagram showing a characterization of the output of a read transducer reading an A burst and a C burst.

FIG. 8 is a diagram showing a characterization of the output of a read transducer 602 reading A burst 802 and C burst 804. In this case, the read transducer 602 has a trapezoidal shape with an effective width of about 78% of the extent of the effective width of the write transducer.

Figure 9:
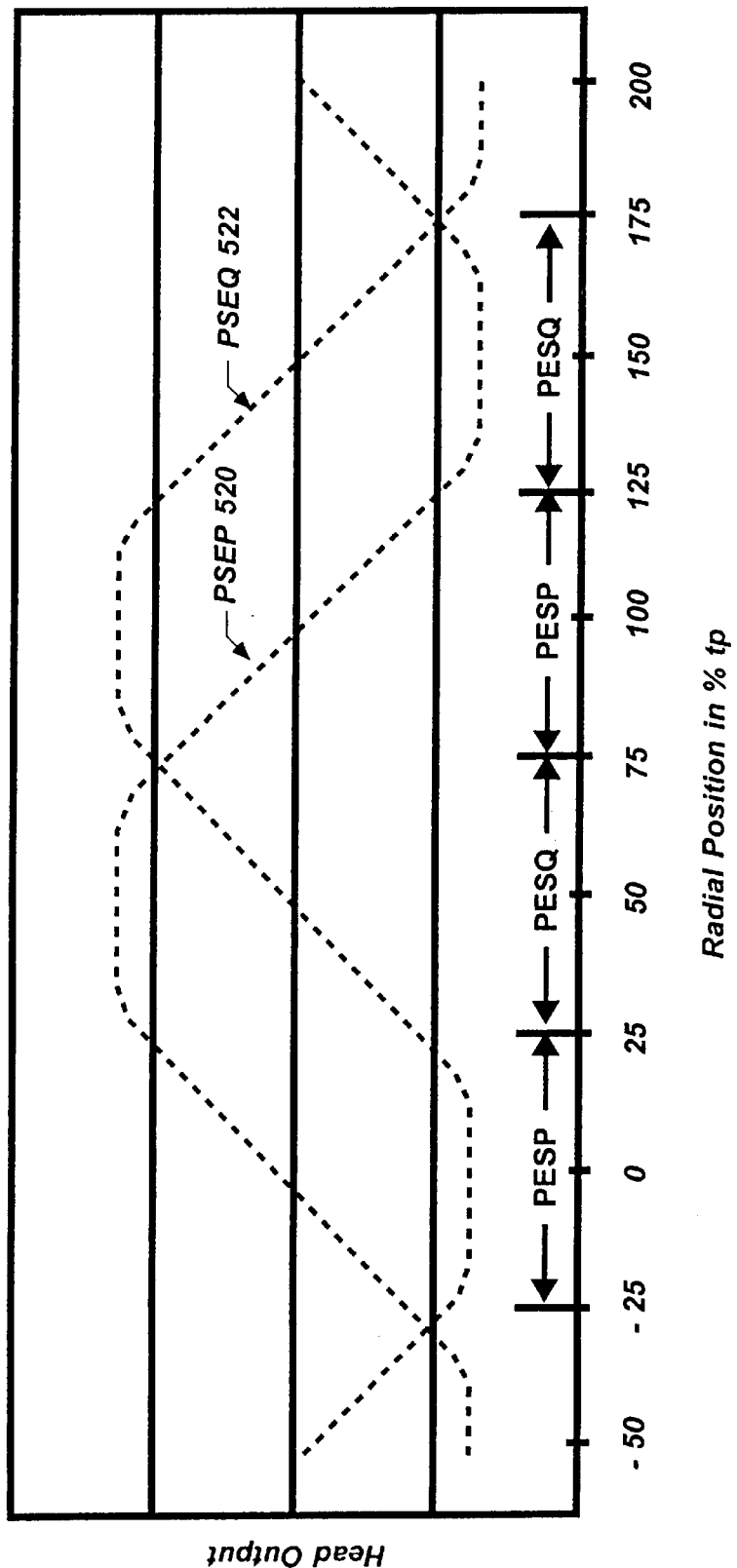
FIG. 9 is a diagram showing a PESP signal and a PESQ signal computed from the read transducer output shown in FIG. 8.

FIG. 9 is a diagram showing a PESP signal 520 and a PESQ signal 522 computed from the read transducer output shown in FIG. 8. Since the magnitude of the peak of the PESP 520 and the PESQ signal 522 was lowered by the narrow width of the read transducer, AGC of the servo loop will apply a gain to these signals to increase the peak value. While this has the desirable effect of increasing the peak amplitude of the PESP 520 and PESQ 522 signals to the desired quantity, it also has the undesired effect of increasing the slope of both signals near the zero point.

The composite PES is ultimately stitched together using the PESP or the PESQ signal at the quarter track points depending on the logic described above. It can be seen that errors in the PESP and PESQ signals at the quarter track points will introduce discontinuities in the composite PES. These discontinuities can be substantially removed by normalization to the quarter track points.

Figure 10:
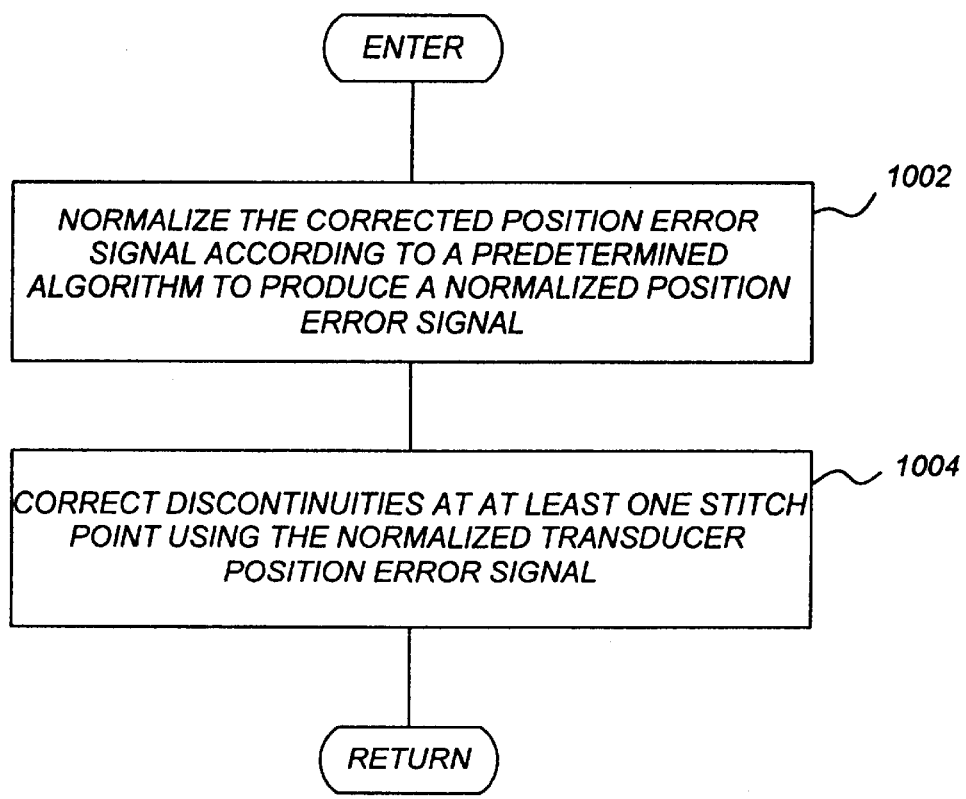
FIG. 10 presents a flow chart showing exemplary steps used to ameliorate PES discontinuities using an auxiliary discontinuity removal scheme.

FIG. 10 presents a flow chart showing exemplary steps to ameliorate PES discontinuities using an auxiliary discontinuity removal routine. The discontinuity removal routine scales the PESP and PESQ signals so that they meet at the stitch points, thus eliminating discontinuities in the composite PES. First, the corrected position error signal is normalized according to a predetermined algorithm to produce a normalized position error signal, as shown in block 1002. Then, the discontinuities are corrected at at least one stitch point using the normalized transducer position error signal using the normalized transducer position error signal, as shown in block 1004.

Figure 11:
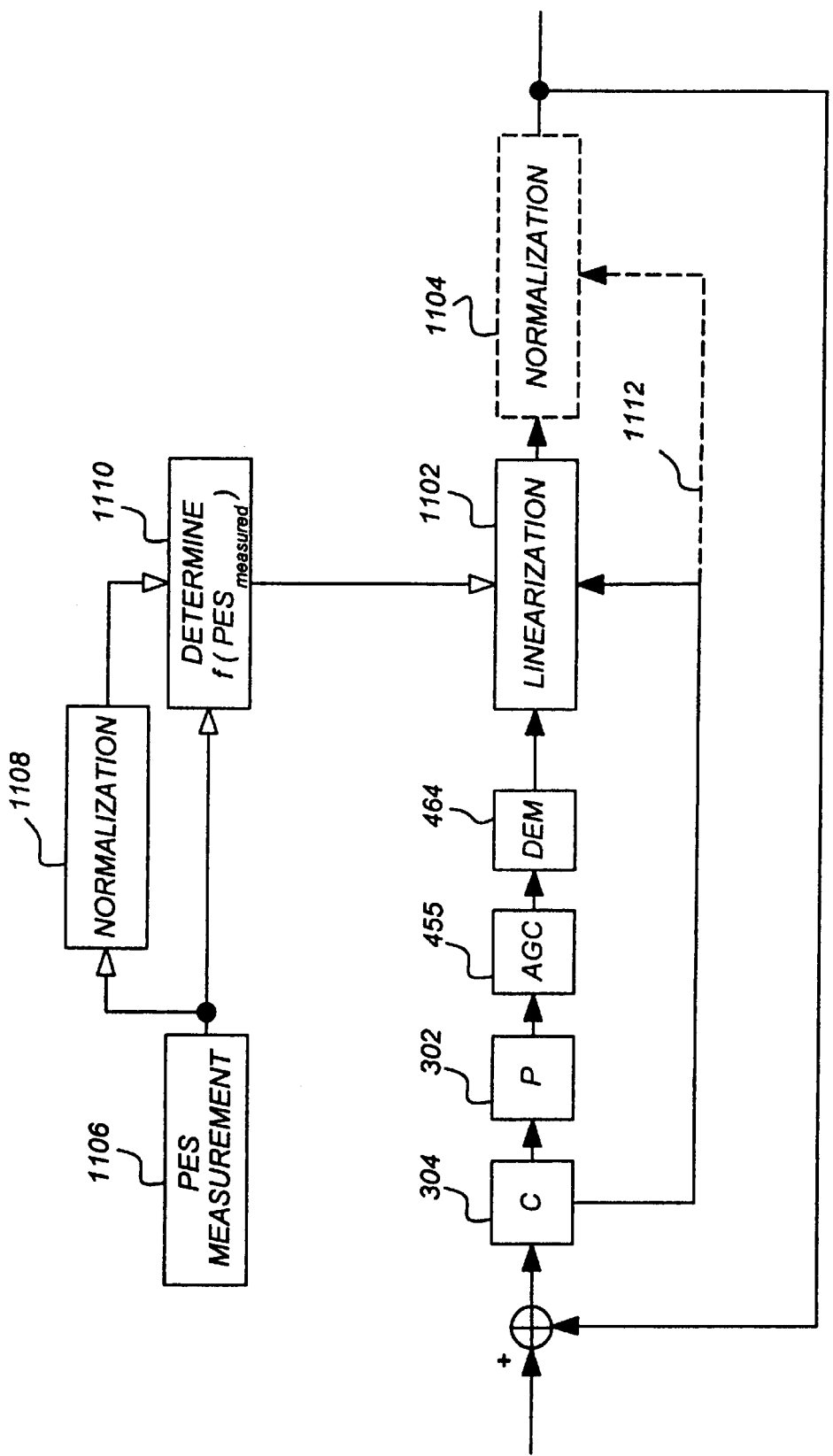
FIG. 11 is a block diagram of a closed loop servo control system implementing a normalization scheme.

FIG. 11 is a block diagram of a closed loop servo control system implementing the normalization scheme described above. A normalization stage 1104 is provided at the output of demodulator 464. Normalization corrects the gain and linearity of a position signal, and allows the removal of discontinuities at stitch points. The normalization stage is preferably implemented in the control microcode as part of the servo control process can be used with or without the linearization stage 1102. According to one embodiment of the present invention, normalization is applied using an algorithm determined by the width of the read transducer. According to a second embodiment, normalization is selectively applied at radial transducer positions near the stitch points of the position signal, but is not applied at radial positions near the zero-crossing points. In a third embodiment of the present invention, a first normalization algorithm is applied near the stitch points and a second normalization algorithm is applied at the zero-crossings. In a fourth embodiment, a smoothing function is applied at radial positions between the stitch points and zero-crossings to smooth the transition from normalized to unnormalized signal contributions or from signal contributions normalized in a first manner to signal contributions normalized in a second manner. A further aspect of the present invention is to saturate the PES at each stitch point where the gain calibrated PES is determined to be higher than a nominal value.

Each of the preferred embodiments includes a normalization step that is preferably executed on a sector by sector basis as part of the servo control process. In a quad-burst architecture environment, the algorithm is generally represented by the following equations:

$$PESP' = f_1(PESP, PESQ) \quad (3)$$

$$PESQ' = f_2(PESP, PESQ) \quad (4)$$

Figure 12A:
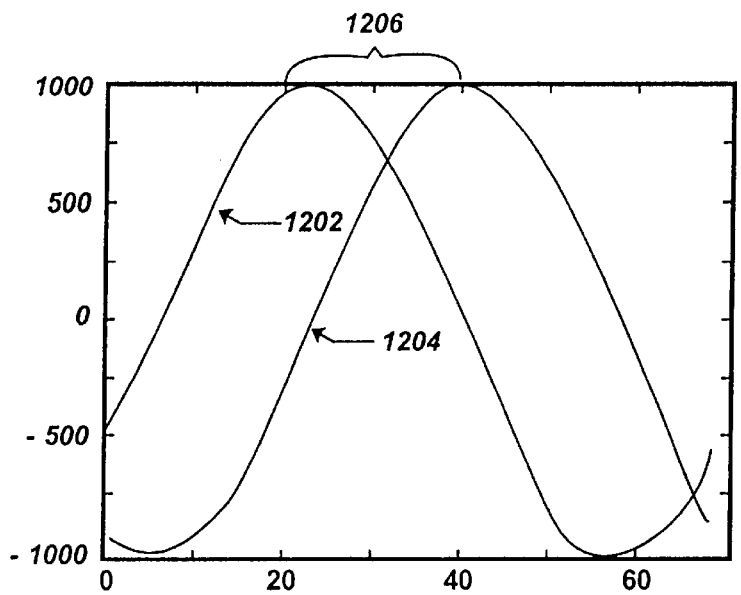
FIGS. 12A and 12B and 13A and 13B illustrate the primary and quadrature 21 waveforms before and after normalization as representative of read transducers having wide and narrow effective widths, respectively.
Figure 12B:
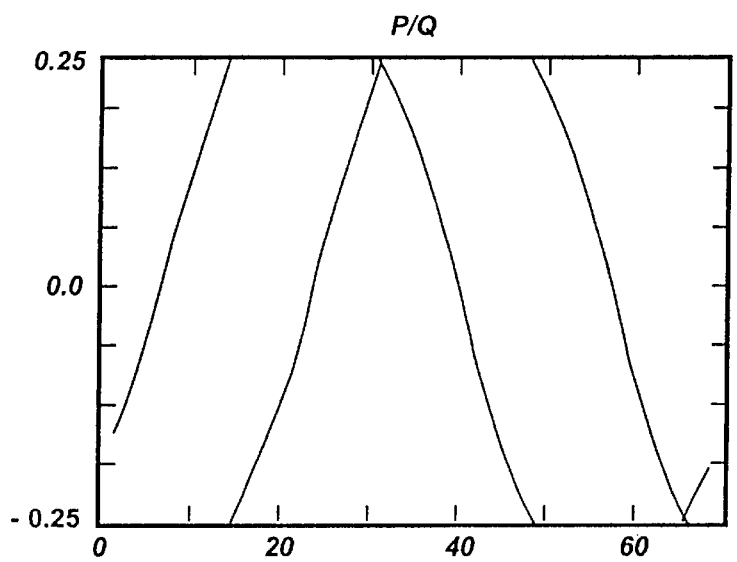

Returning to a quad-burst environment, if the read transducer has a wide read width, it will sense a larger radial section of the servo bursts and will produce the PESP 1202 and PESQ 1204 signals of FIG. 12A. These signals include substantially linear portions, but characteristically drop off in a curve at their peaks. Under these circumstances, the sum of the absolute values of PESP and PESQ is approximately constant, and can be used to normalize the signals. An example of an appropriate normalization function is:

$$PESX' = PESX \cdot \frac{|PESP_{nom}| + |PESQ_{nom}|}{|PESP| + |PESQ|} \quad (5)$$

where $PESP_{nom}$ and $PESQ_{nom}$ are the ideal PESP and PESQ amplitude values at any stitch point, and PESP and PESQ are the actual amplitude values, all in units of data track width. For the specific embodiment described above, the sum $|PESP_{nom}|+|PESQ_{nom}|$ is equal to 0.5 grey code tracks. The results of such normalization are shown in FIG. 12B.

Figure 13A:
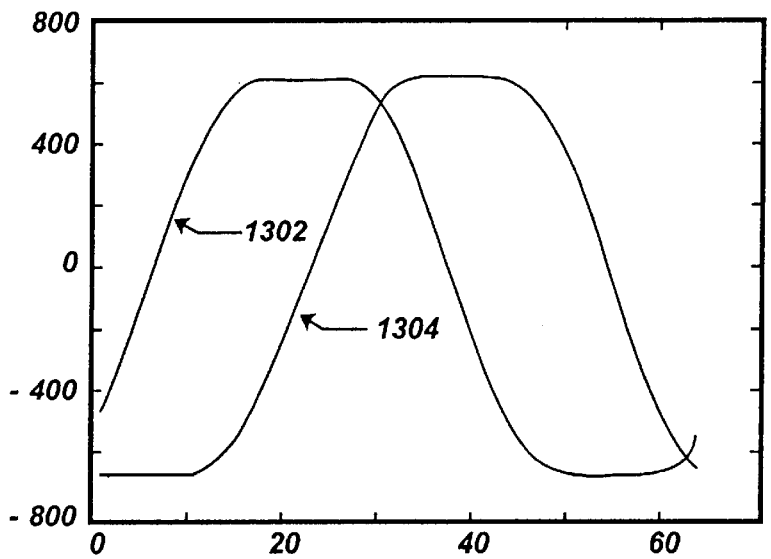

The PESP 1302 and PESQ 1304 signals for a transducer having a narrow read head are shown in FIG. 13A. The PES signals tend to be flat at their peaks, i.e. when the read transducer is centered on a servo burst. Under these conditions, it is more desirable to normalize the position error signals using either PESP or PESQ. One example of such a function is shown below:

$$PESP' = PESP \cdot \frac{|PESQ_{nom}|}{|PESQ|} \quad (6)$$

$$PESQ' = PESQ \cdot \frac{|PESP_{nom}|}{|PESP|} \quad (7)$$

Figure 13B:
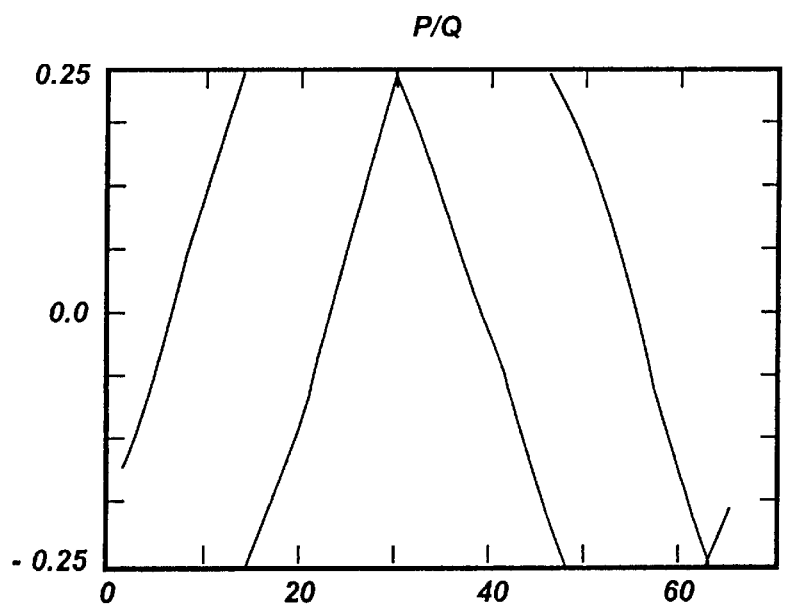

The results of such normalization are shown in FIG. 13B.

To implement any of the preceding normalization algorithms in a processor, first or second order polynomial approximations of the functions can be used in a manner generally familiar to those of ordinary skill in the art.

A further refinement of either scheme above is possible. The values $$G(t) = \frac{|PESP_{nom}| + |PESQ_{nom}|}{|PESP| + |PESQ|} \text{ or}$$

$$G(t) = \frac{|PESQ_{nom}|}{|PESQ|} \text{ or}$$

$$G(t) = \frac{|PESP_{nom}|}{|PESP|} \text{ are the amount}$$

of gain that has to be applied at time t to PESP or PESQ such that G(t)·PESP=G(t)·PESQ+offset (e.g., G(t) is the amount of gain needed to eliminate the discontinuity at the stitch point). It may be desirable to average G(t) over a number of sectors to reduce the effect of a single sector error. In such a scheme, the controller keeps a running average or filtered value of this needed gain via such an equation as:

$$G'(t) = \alpha \cdot G'(t-1) + (1-\alpha) \cdot G(t) \quad (8)$$

Here, $\alpha$ is a number between zero and one, and G'(t) represents the averaged gain adjustment. If a is equal to zero, then there is no averaging, and the scheme is as previously described. If a is equal to one, then there is no normalization. The averaged gain adjustment value G'(t) is communicated to the normalization block 2104 via communication link 1112, as indicated in FIG. 11 by the dashed line. Then, $$PESX' = G'(t) \cdot PESX. \quad (9)$$

The normalization algorithms presented above are well-suited to the particular cases of wide and narrow read widths relative to the servo burst patterns. However, for heads having widths between these two extremes, normalization causes nonlinearities near the zero-crossing regions. A second embodiment is therefore presented wherein normalization is only applied to the PES signals in a selected range of radial positions including each stitch point. Implementation of this embodiment preferably involves two steps. In a first step, a normalized value, PESX', is calculated at the current radial position of the head as previously described. In a next step, PESX' and PESX are incorporated into the following function to obtain the position error signal to be used in generating the ultimate position signal:

$$PESX_{new} = PESX' \cdot f_3(PESX) + PESX \cdot \{1 - f_3(PESX)\} \quad (10)$$

where $f_n$ is a function having a value of or very close to zero in the region of each PESX zero crossing, and a value of or very close to one in the region of each stitch point. The value of PESX at a stitch point is ideally equal to 0.25 for the present example. Accordingly, one example of a suitable function is:

$$f_3(x) = \begin{cases} 0 \text{ where } 0 \le x < 0.125 \\ 1 \text{ where } 0.125 < x \le 0.25 \end{cases} \quad (11)$$

where x is approximated by the PES value. A similar equation is used when x has a negative value. For convenience, the switch from actual to normalized PES has been selected to occur at a radial transducer position midway between the stitch point and the zero crossing point of each PES segment. It should be apparent, however, that the switchover point may be adjusted so that normalization is applied to a smaller or larger range of radial positions including the stitch points, as desired.

As an alternative to function (11), different normalization algorithms may be applied at the stitch and zero-crossing points. For example, function (5) is applied at the zero-crossings, and equations (6) and (7) are applied at the zero-crossings. Thus, the two-step process would be redefined as follows: in a first step, PESX' and PESX" are calculated, where PESX' corresponds to a PESX value normalized according to a first normalization algorithm, and PESX" corresponds to a PESX value normalized according to a second normalization algorithm. Function (10) is then rewritten as:

$$PESX_{new} = PESX' \cdot f_3(PESX) + PESX'' \cdot \{1 - f_3(PESX)\} \quad (12)$$

Functions (11) and (12) are adequate when the values for PES and PES' are anticipated to be close enough in value not to cause significant discontinuity at the switchover point. However, if the PES and PES' values (or the PES' and PES" values) differ significantly from one another in these regions, application of these functions will introduce discontinuities at the switchover points unless additional compensation is provided. In such circumstances, and according to a fourth preferred embodiment of the present invention, a smoothing function is incorporated into $f_3(x)$ to produce a smooth transition between PESX to PESX' (or PESX' and PESX") at each switching point. For example, the preceding function may be modified as shown below:

$$f_3(x) = \begin{cases} 0 \text{ where } \frac{0}{12} \le x < \frac{1}{12} \\ (12x - 1) \text{ where } \frac{1}{12} \le x < \frac{2}{12} \\ 1 \text{ where } \frac{2}{12} \le x < \frac{3}{12} \end{cases} \quad (13)$$

Again, a similar equation is used when x is negative.

The preceding steps will now be applied to a specific example to illustrate correction of discontinuities resulting from low AGC gain, or similar discontinuities caused by variations in the burst patterns themselves. For purposes of this example, the position signal is designated YMK and comprises the sum of information obtained from the grey code, the track type, and the appropriate PESX. The gain factor of the gain calibration process is simply designated as AGC. It will be assumed for convenience that the value obtained from the grey code is zero and that the present transducer position is at a zero track type moving radially toward a type one track. While the transducer is within the range of the stitch point and within the zero track type, the value of YMK is defined as:

$$YMK = AGC \cdot PESP \quad (14)$$

When the transducer crosses into the next track type, YMK is thereafter defined as:

$$YMK = 0.5 + AGC \cdot PESQ, \quad (15)$$

for as long as the transducer remains near the stitch point and in the radial range of the type one track, since PESX=PESQ and the offset for a type one track is 0.5 grey code track widths. At the stitch between track types zero and one, ideally, $$AGC \cdot PESP = 0.5 + AGC \cdot PESQ = 0.5 - 0.25 = 0.25 \quad (16)$$

So PESP and PESQ are equal at the stitch points. Assuming a low AGC gain however, the actual products will be lower, e.g.:

$$AGC \cdot PESP = -AGC \cdot PESQ = 0.2 \quad (17A)$$

and $$0.5 - AGC \cdot PESQ = 0.3 \quad (17B)$$

at the stitch point. Under these conditions, when the transducer moves from a track type zero to a track type one, it will appear to the servo control system that the transducer is moving from 0.2 grey code tracks to 0.3 grey code tracks because YMK=0.5−0.2=0.3 grey code tracks. The low gain therefore produces a substantial discontinuity of 0.1 grey code track and adversely affects the servo performance. This effect arises because a minute change of position appears as a motion of 0.1 grey code tracks, provoking a vigorous servo response. This response, in turn, induces real and undesirable motion.

Applying the normalization step to the present example, the products AGC·PESP and AGC·PESQ are scaled by the normalization factor. For purposes of the present invention, the normalization factor is derived from equations (17A) and (17B), i.e., 0.5/(|PESP|+|PESQ|). For track type zero:

$$YMK = PESP \cdot AGC \cdot \frac{0.5}{|PESP| + |PESQ|} = 0.2 \cdot \frac{0.5}{0.4} = 0.25 \quad (18)$$

and for track type one:

$$YMK = \qquad (19)$$
$$0.5 + PESP \cdot AGC \cdot \frac{0.5}{|PESP| + |PESQ|} = 0.5 + (-0.2) \cdot \frac{0.5}{0.4} = 0.25$$

Thus, by applying normalization for radial transducer position near the stitch point, discontinuity at the stitch point is eliminated.

Were normalization to occur in the vicinity of the zero crossing points, however, the slope of YMK would be altered by as much as 30%. For example, it will be assumed that the read head has a narrow effective width relative to a nominal width. As a result, if PESP has a value of 0.01 near its zero-crossing point, PESQ may have a value of 0.39 rather than the nominal value of 0.49. This deviation is due to flattening of the PESQ curve as was illustrated in FIG. 13A. Consequently:

$$YMK = PESP \cdot AGC \cdot \frac{0.5}{|PESP| + |PESQ|} = 0.01 \cdot \frac{0.5}{0.4} = 0.0125 \quad (20)$$

Under these circumstances, application of the normalization step introduces a 25% error. The variation in slope is explained by the fact that the sum |PESP|+|PESQ| does not remain constant radially, but rather reaches a maximum value at the stitch point and a minimum value at the zero crossing. The minimum is determined by the read head width and is therefore not easily corrected.

This effect can be minimized by using function $f_3(x)$ as defined in equation (13) in the determination of YMK. This implementation does not normalizes the gain of the servo system where required to align the stitch points, but does not normalize the gain of the servo system in the vicinity of the zero crossing points. Hence, YMK is not adversely affected.

According to the alternative embodiment, PESX is normalized at the zero-crossing points, but normalization is performed using a different algorithm selected to reduce nonlinearity in this region. Examples of normalization factors include $$PESX \cdot \left[ \frac{(A_{nom} + B_{nom})}{A + B} \right] \text{ and}$$

$$PESX \cdot \left[ \frac{(A_{nom} + B_{nom} + C_{nom} + D_{nom})}{A + B + C + D} \right]. \text{ These particular}$$

algorithms do not adjust for discontinuity at the stitch points, but do provide a linear signal at the zero-crossings and further eliminate the need for a separate calibration stage.

Figure 14:
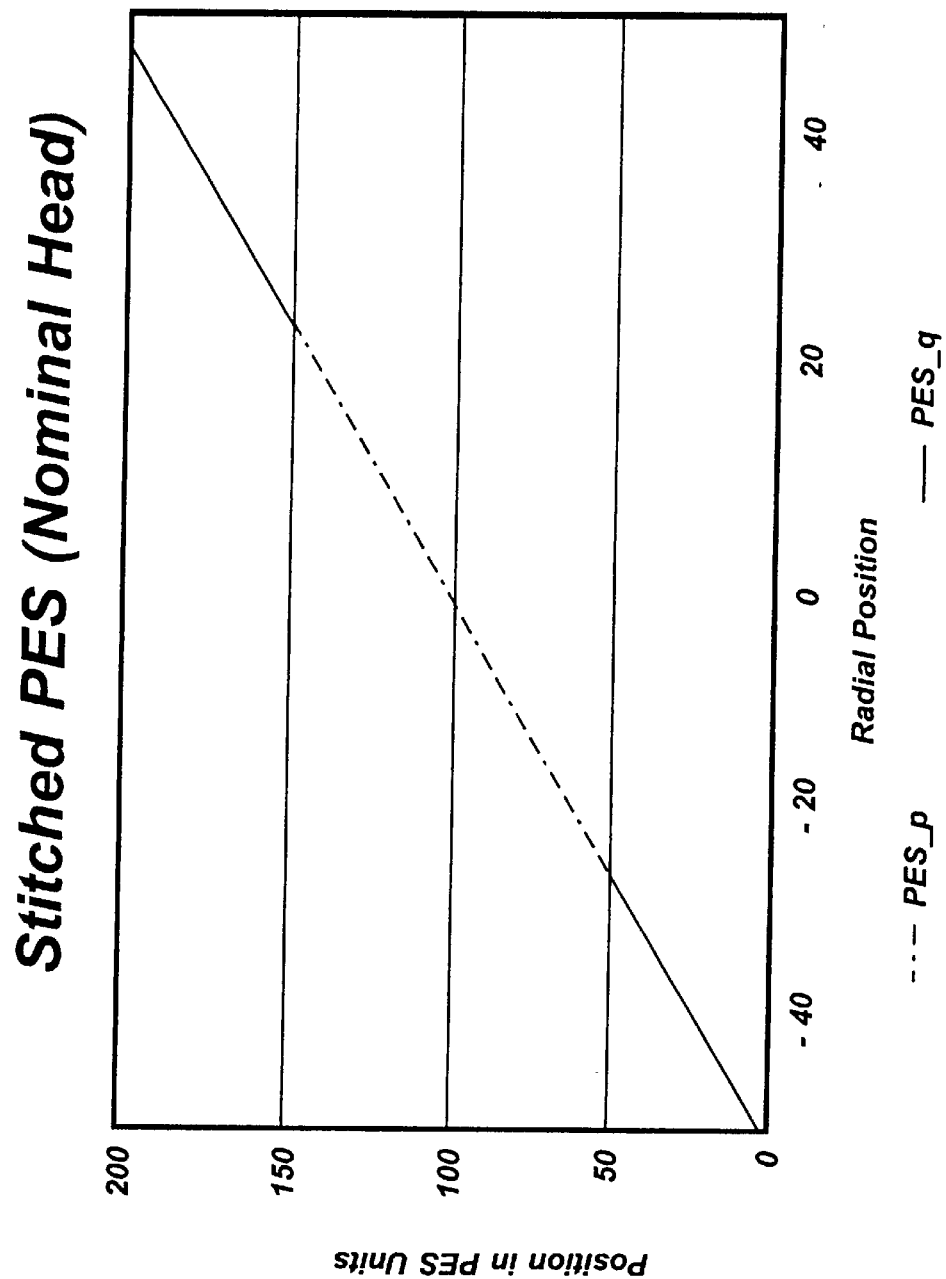
FIG. 14 is a diagram showing a stitched PES signal using a read transducer with a nominal effective width and PESP and PESQ signals exhibiting a predominantly linear characteristic in the ±¼ track region.

When the PESP and the PESQ signals are linear in the ±¼ track region and scaled so that they meet at the stitch points, the stitched PES using a read transducer with a nominal effective width will generally exhibit the linear and discontinuity-free characteristic shown in FIG. 14. However, when the PESP and PESQ signals are not linear in the ±¼ track region, this is not the case.

Figure 15:
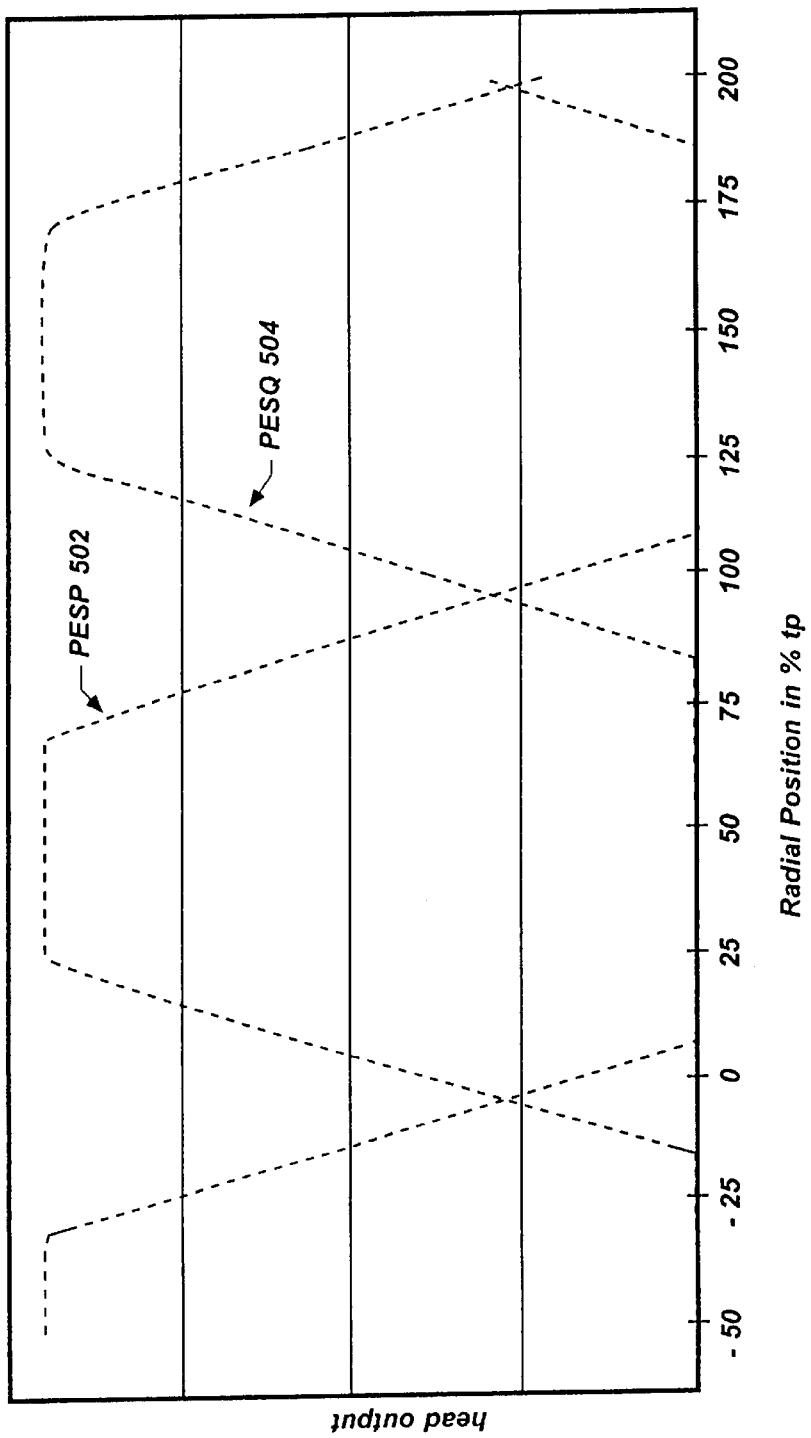
FIG. 15 is a diagram showing a characterization of the output of a read transducer similar to that shown in FIG. 8, but with an effective width of only 50% of that of the write transducer.

FIG. 15 is a diagram showing a characterization of the output of a read transducer 602 similar to that shown in FIG. 8, but with a read transducer effective width of only 50% of the effective width of the write transducer.

Figure 16:
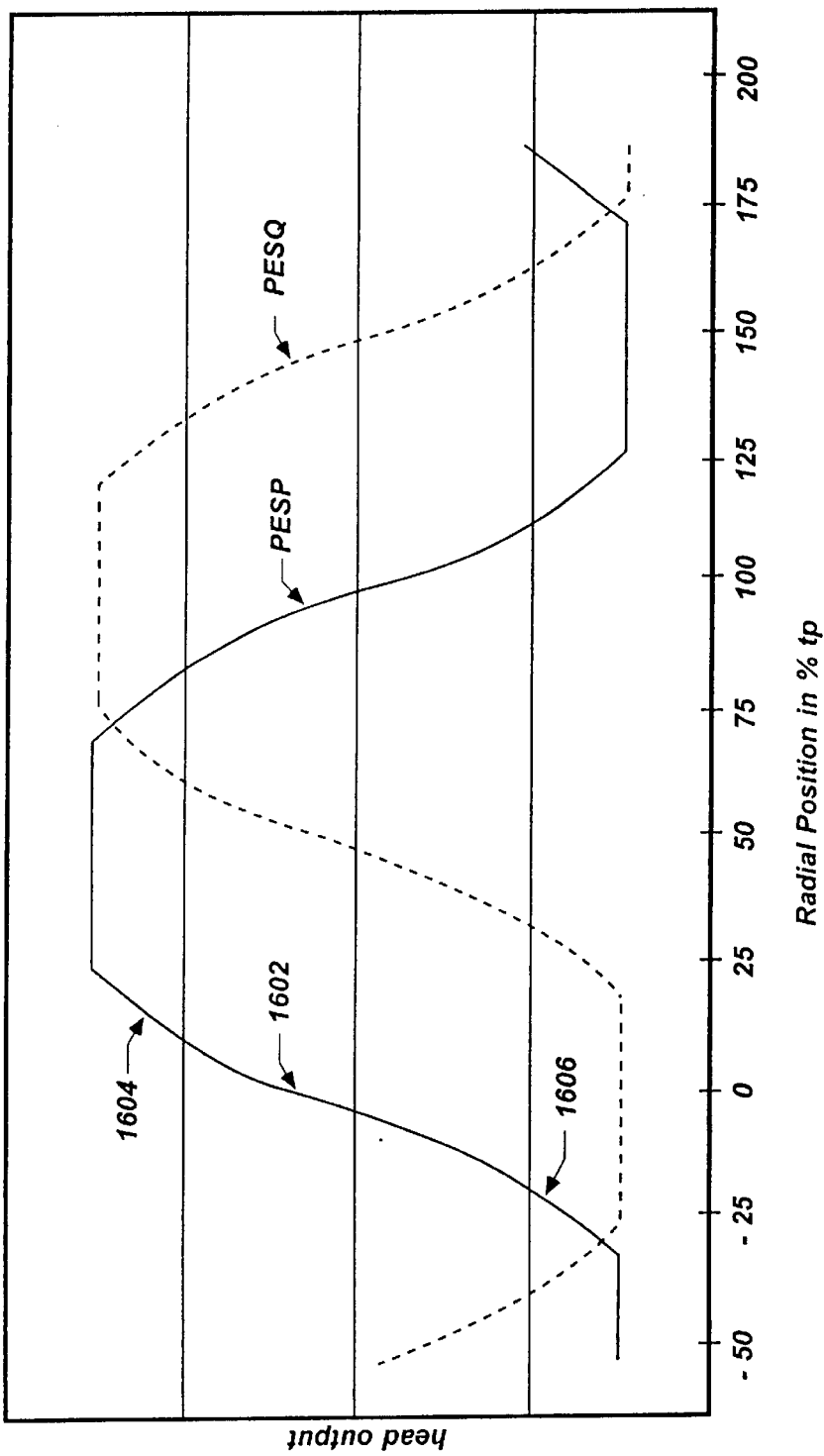
FIG. 16 is a diagram showing the PESP and PESQ signals corresponding to the burst signals presented in FIG. 15.

FIG. 16 is a diagram showing the PESP and PESQ signals corresponding to the burst signals presented in FIG. 15. Note that the output includes a linear segment 1602 with the same slope near the zero track point as was the case in FIG. 9. However, the read transducer characteristics introduce non-linearities in the PESP and the PESQ signals at segments 1604 and 1606, and unlike the case presented in FIG. 8, these non-linearities occur within the ±¼ track boundaries. These non-linearities introduce gain errors, even near the zero track position. These gain errors are a result application of the normalization techniques described above.

Figure 17:
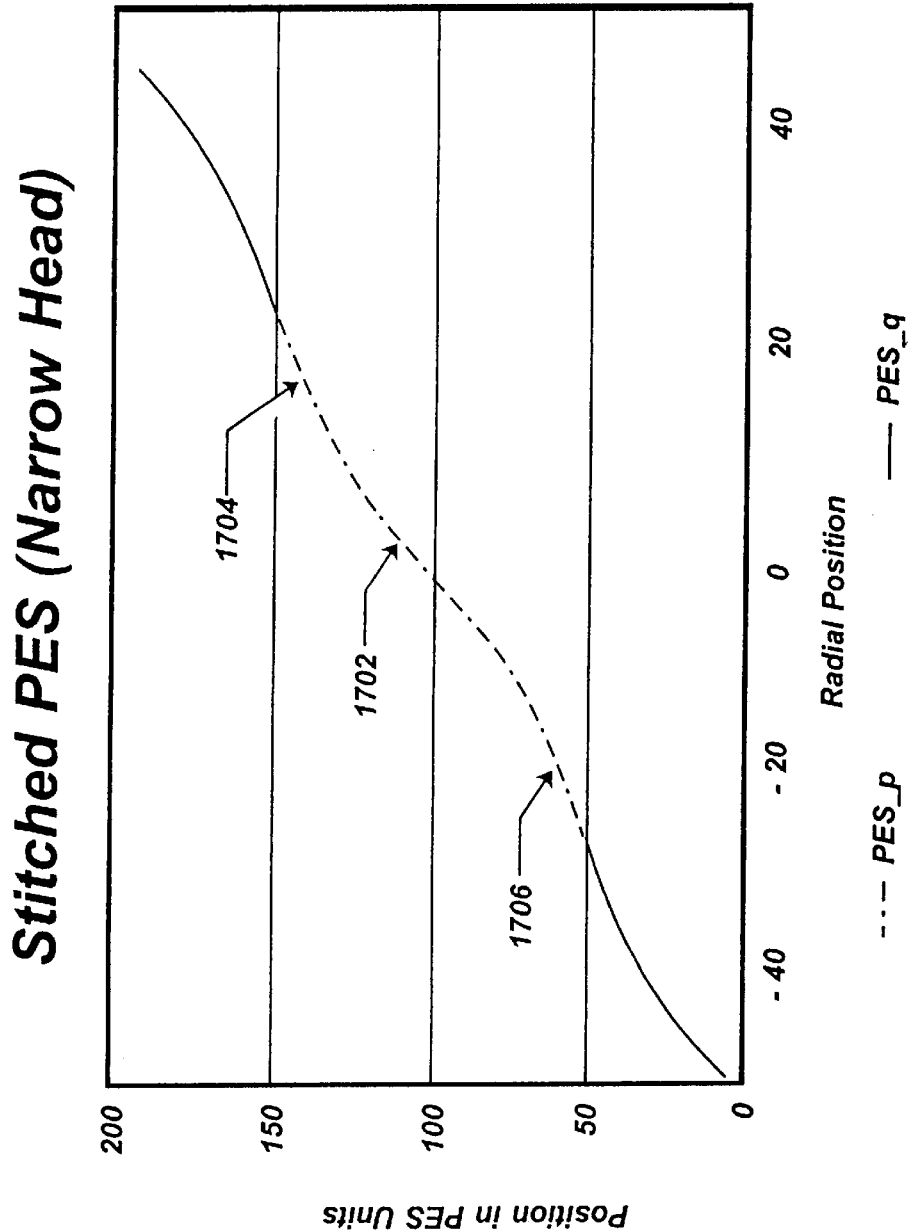
FIG. 17 is a diagram showing a characterization of the stitched PES after applying normalization.

FIG. 17 is a diagram showing a characterization of the stitched PES after application of the normalization techniques. Since the non-linear segments 1604 and 1606 reduce the absolute value of the both PESP and PESQ at the quarter track positions, the normalization introduces a higher slope (excessive gain) near the zero track point in segment 1702. Further, there will be lower slope (insufficient gain) in segments 1704 and 1706. It is worthy to note that the foregoing can occur for narrow read transducer widths even if the read transducer characteristics are ignored, because the value of the PESP and PESQ signals at the quarter track positions will be in a non linear region.

Figure 18:
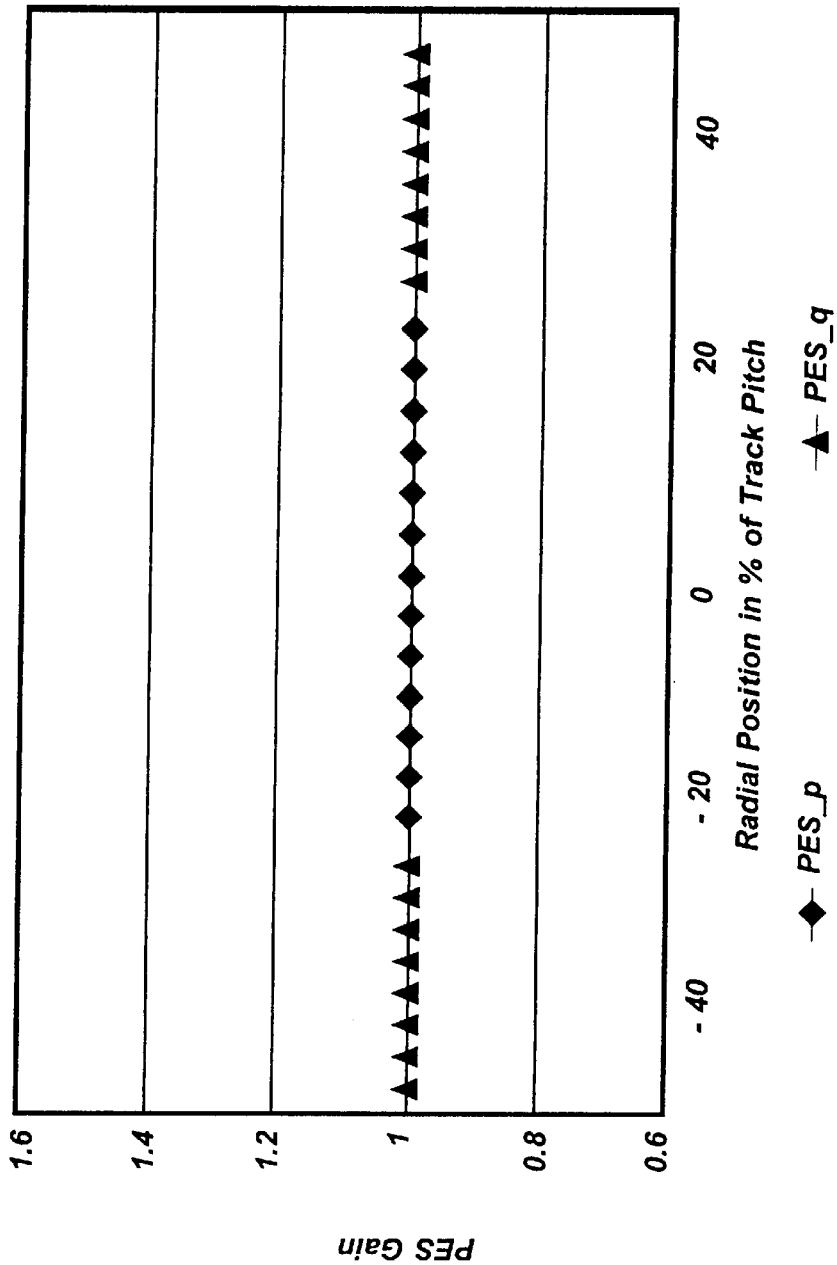
FIG. 18 is a diagram showing a PES gain characteristic for the system described in FIG. 8.

FIG. 18 shows the linear and well-behaved PES gain characteristic for the system described in FIG. 8.

Figure 19:
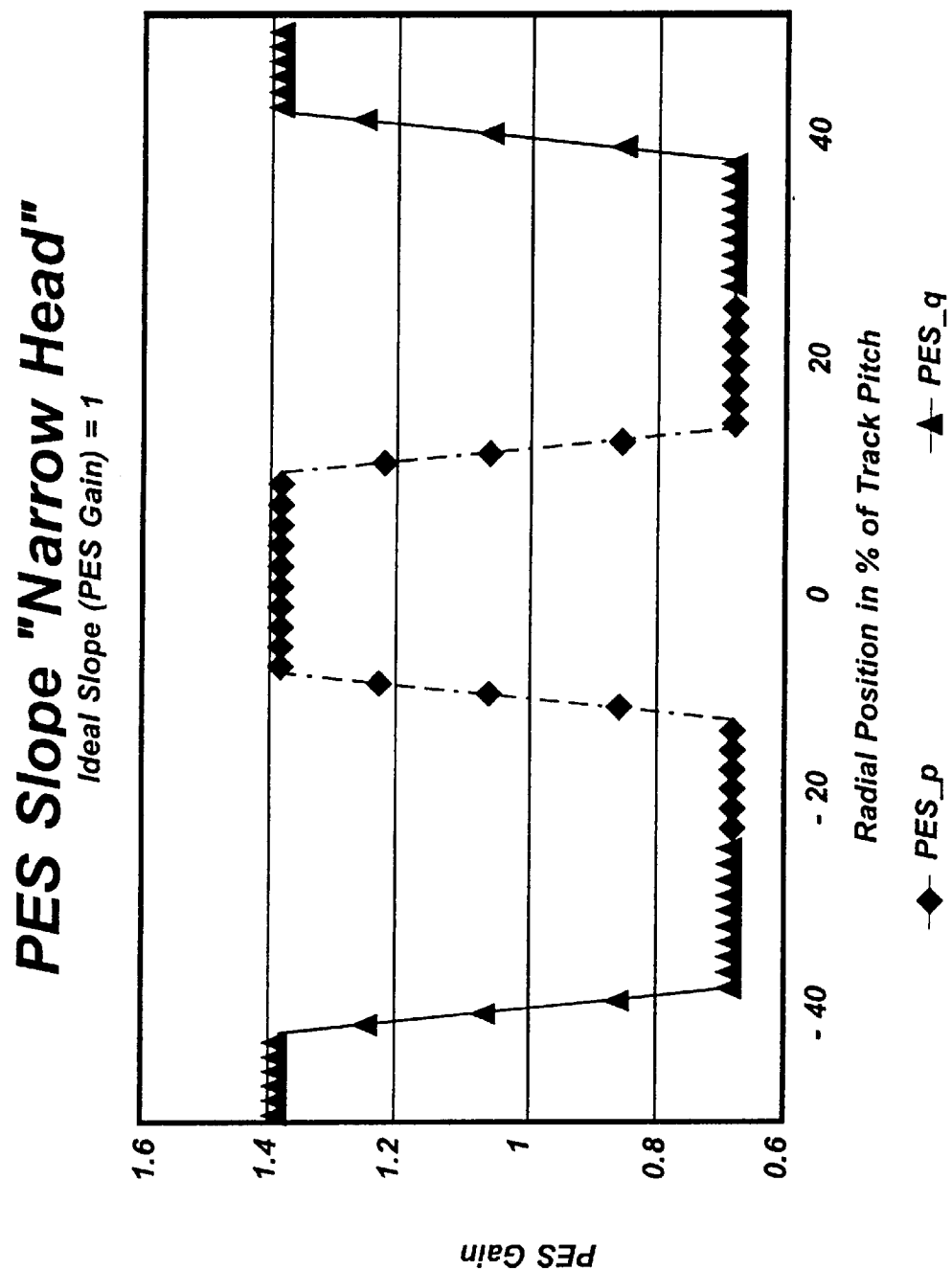
FIG. 19 is a diagram showing the non-linear PES gain characteristic that results from a read head of narrow effective width.

FIG. 19 shows the non-linear PES gain characteristic that results from the system described in FIG. 16.

The foregoing discrepancies in PES measurements manifest themselves as an uncertainty of the gain of the servo system. Where the gain is too high (such as at the zero track position in FIG. 19), the non-repeatable run out (NRRO) of the disk drive increases because the closed loop servo system will tend to overreact to errors. Conversely, where the gain is too low, attenuation of external disturbances will be reduced because the closed loop servo system will under react to errors. This can also cause an increase in the NRRO. The present invention reduces the impact of the read transducer effective width and read transducer sensitivity non-linearities.

Figure 20:
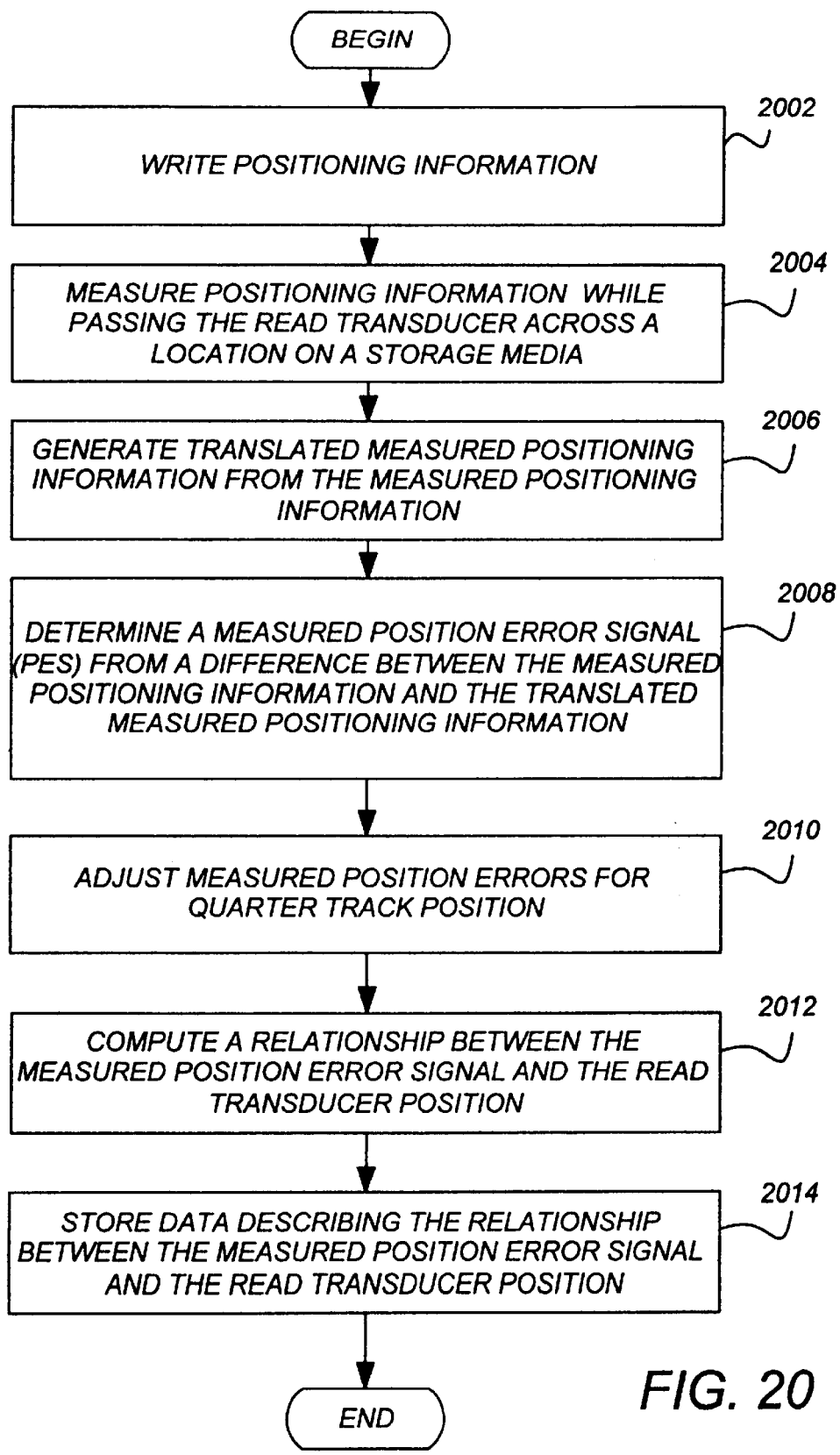
FIG. 20 is a flow chart presenting exemplary process steps used to reduce gain uncertainties in the servo system.

FIG. 20 is a flow chart presenting illustrative process steps used to reduce the gain uncertainties of the servo system. First, the servowriter positions the write head at a desired location on the disk 112, and positioning information is written to the surface of the storage media, as shown in block 2202. The positioning information can comprise multiple signal components or a single component such as A burst 504. Next, the servowriter moves the read transducer 602 far enough to the outer edge (OD) of the disk 112 such that the read transducer 602 cannot sense any of the positioning information just written. Then, positioning information such as the amplitude of the signal read by the read transducer 602 is measured by passing the read transducer 602 across the location while reading the positioning information, as shown in block 2204.

Figure 21:
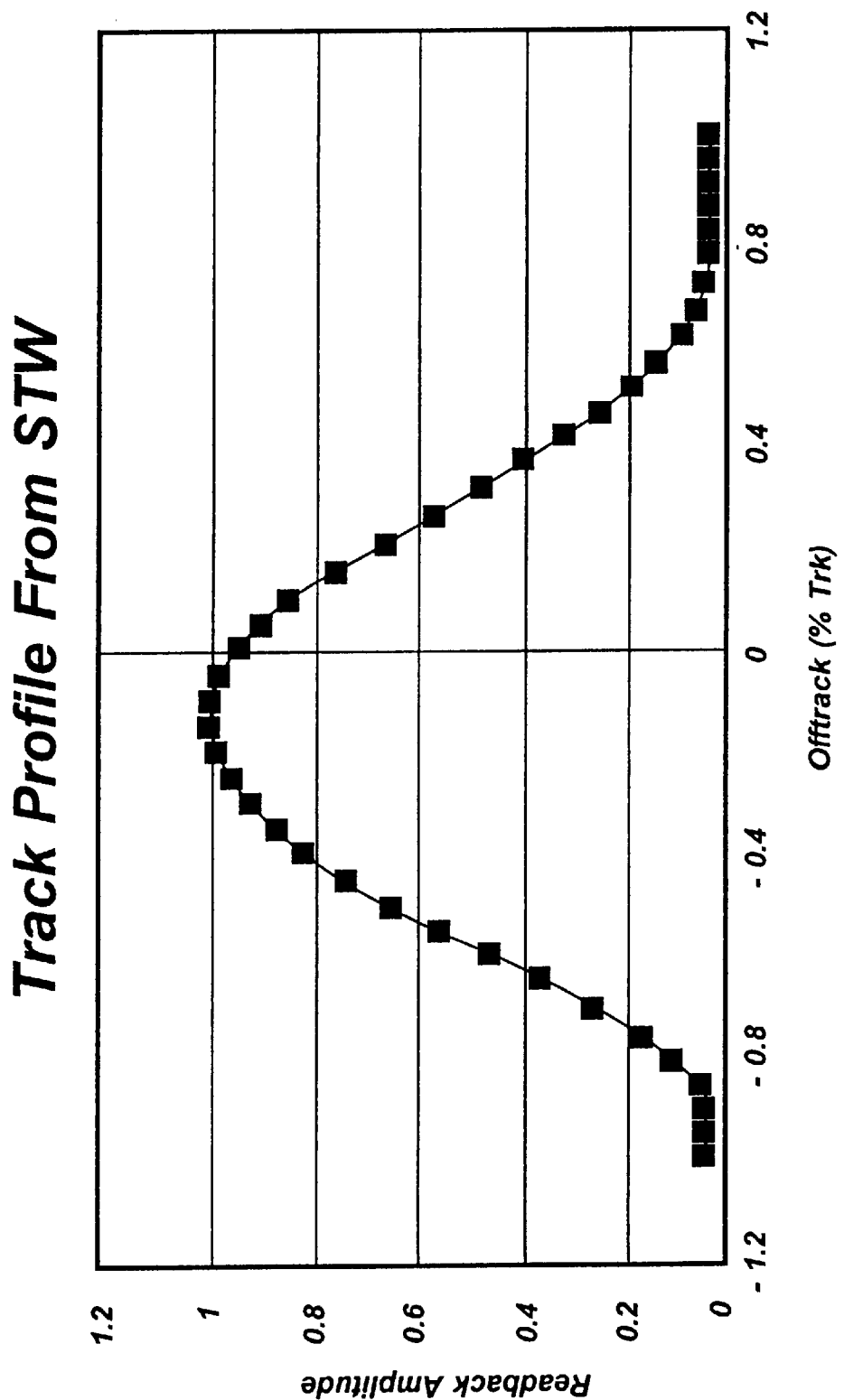
FIG. 21 is a diagram showing a typical measurement of the amplitude of the read transducer 602 signal as a function of the read transducer position.

FIG. 21 is a diagram showing a typical measurement of the amplitude of the read transducer 602 signal as a function of the read transducer position, expressed as a percentage from the zero offtrack position. At the zero offtrack position, the read transducer 602 is geometrically centered on the track, while at the ±1.0 positions, the read transducer 602 is centered at the edge of the track. Note that the peak readback amplitude does not occur at the zero offtrack position, is not constant with offtrack position, and is not symmetric. These factors combine to create errors in the measured head position.

The next task is to use the measured positioning information to generate a measured position error signal ($PES_{measured}$). As described above, the PES signal is ordinarily created by stitching together segments derived from the PESP signal 520 and the PESQ signal 522. Hence, both the measured PESP signal 520 ($\text{PESP}_{measured}$) and the PESQ signal 522 ($\text{PESQ}_{measured}$) must be determined.

As described herein, PESP=A−C, hence, the generation of the measured PESP signal 520 from the measured positioning information requires information for the C burst 508 as well. This can be accomplished in different ways. First, both the A burst 504 and the C burst 508 can written and read, and the readback amplitude of the A burst 504 and the C burst 508 can both be used to generate a PESP signal 520. However, since the primary source of errors are non-linearities in the read transducer 602 (which is used to measure both the A burst 504 and the C burst 508) it is not necessary to write or read both the A burst 504 and the C burst 508. Instead, the readback amplitude of the A burst 504 measurement can be used to derive a predicted C burst 508 measurement. To accomplish this, the A burst measurement is position-translated by the appropriate amount (in the quad-burst signal embodiment described above, this requires a translation of one track). This is depicted in step 2004 of FIG. 20. Similarly, since the PESQ signal 522 is nominally the same as the PESP signal 520 position-translated by ½ track, the measured PESQ signal can be determined using a similar technique (e.g. position-translating the $\text{PESP}_{measured}$ by ½ track).

If the servo loop implements the gain adjustment A to account for gain errors due to the AGC, a gain factor A may be applied to the measured PESP and measured PESQ as described in equations (5)–(7) above to create an adjusted value for the measured PESP and PESQ. This is depicted in block 2010.

Returning to FIG. 20, a relationship is computed 2012 between the measured position error signal $\text{PES}_{measured}$ and the position of the read transducer 602 using the head position and error signal measurements described above. Then, as depicted in block 2014, data describing the relationship between the measured position error signal and the read transducer 602 position is stored for further use. This data may be stored on the storage media itself in a reserved area, in an application specific integrated circuit (ASIC) in the disk drive controller, in a non-volatile or volatile memory within other disk drive electronics, or in a memory in a computer card accessible to the disk drive.

The relationship between the measured position errors and the read transducer 602 can be computed and stored in different forms. In one embodiment of the present invention, the relationship between the measured position error signal and the read transducer 602 position is simply stored in a database, and lookup table functionality with interpolation capability is used to determine the read transducer 602 position.

In another embodiment of the present invention, the function described in Equation 21 below is determined from the read head position and the measured position errors, and parameters describing this function (such as variable coefficients) are computed and stored.

$$p = f(\text{PES}_{measured}) \tag{21}$$

Figure 22:
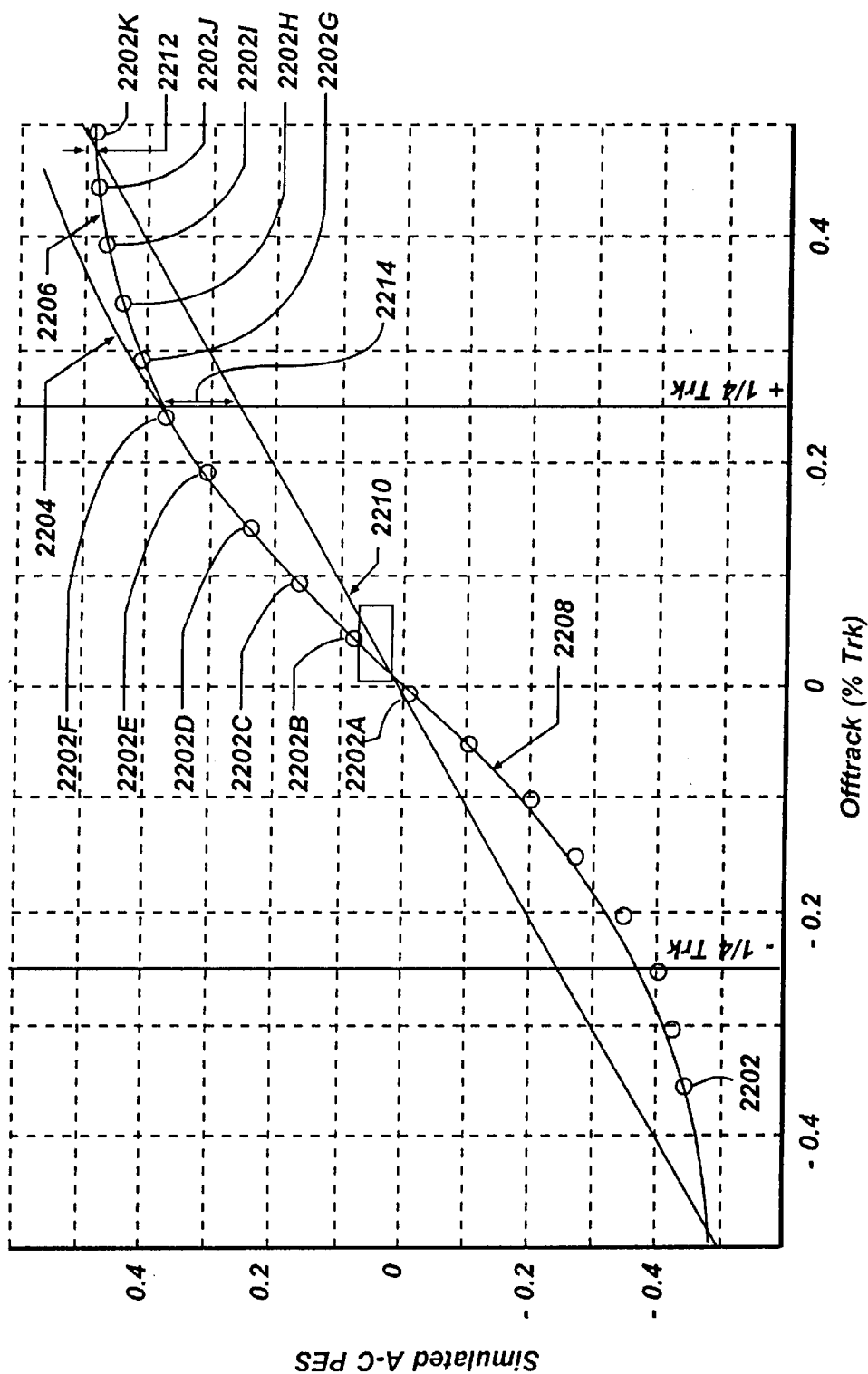
FIG. 22 is a diagram showing the value of measured PESP values as a function of read transducer offtrack distance.

FIG. 22 is a diagram showing the value of $\text{PESP}_{measured}$ as a function of the offtrack distance of the read transducer 602. Data points 2202 are generated from the measurements and computations described above with respect to $\text{PESP}_{measured}$. Plot 2204 is the result of a second order polynomial fit using data points 2202A–2202F. Plot 2208 is the result of a second order polynomial fit using the remaining data points using data points 2202A–2202K. Using a relationship between the ideal linear position error signal 2210 and the curve-fitted measured position error signal 2204 or 2206, a function according to Equation (21) is derived and applied to the measured PES to determine a more accurate representation of the read transducer's position for use in the servo control system.

In one embodiment of the invention, the data points for negative offtrack positions are determined by mirroring the positive offtrack curve-fitted measurements as shown by trace 2208. In this case, $$p = f_1(\text{PES}) \text{ when PES} \geq 0; \text{ and} \tag{22}$$

$$p = -f_1(-\text{PES}) \text{ otherwise.} \tag{23}$$

In another embodiment of the invention, the different curve fits can be determined for positive offtrack positions and negative offtrack positions. In this case, $$p = f_1(\text{PES}) \text{ when PES} \geq 0 \text{ and} \tag{24}$$

$$p = f_2(\text{PES}) \text{ otherwise.} \tag{25}$$

The effect of these curve fits is to calibrate servo system to accommodate the characteristics of the read transducer. In essence, the read transducer characteristic shown in FIG. 21 is quantified and taken into account when determining the PES. This increases the linearity of the PES signal at the zero track positions.

In an alternative embodiment of the present invention, the PESP and PESQ functions can be stitched together before the relationship between the measured position error signal and the read transducer 602 position is determined (by curve fitting or otherwise) and stored. Further, the foregoing operations can be performed for multiple locations on the storage media to determine the relationship between measured position error signals and the read transducer 602 position. These results can then be aggregated together to generate a single calibration profile for all locations on the storage media, or stored separately, and selectably when the read transducer 602 is operating within particular regions of the storage media. Further, if desired, the foregoing operations can be performed for each read transducer 602 in the disk drive system 110, and either aggregated or stored separately.

Figure 23:
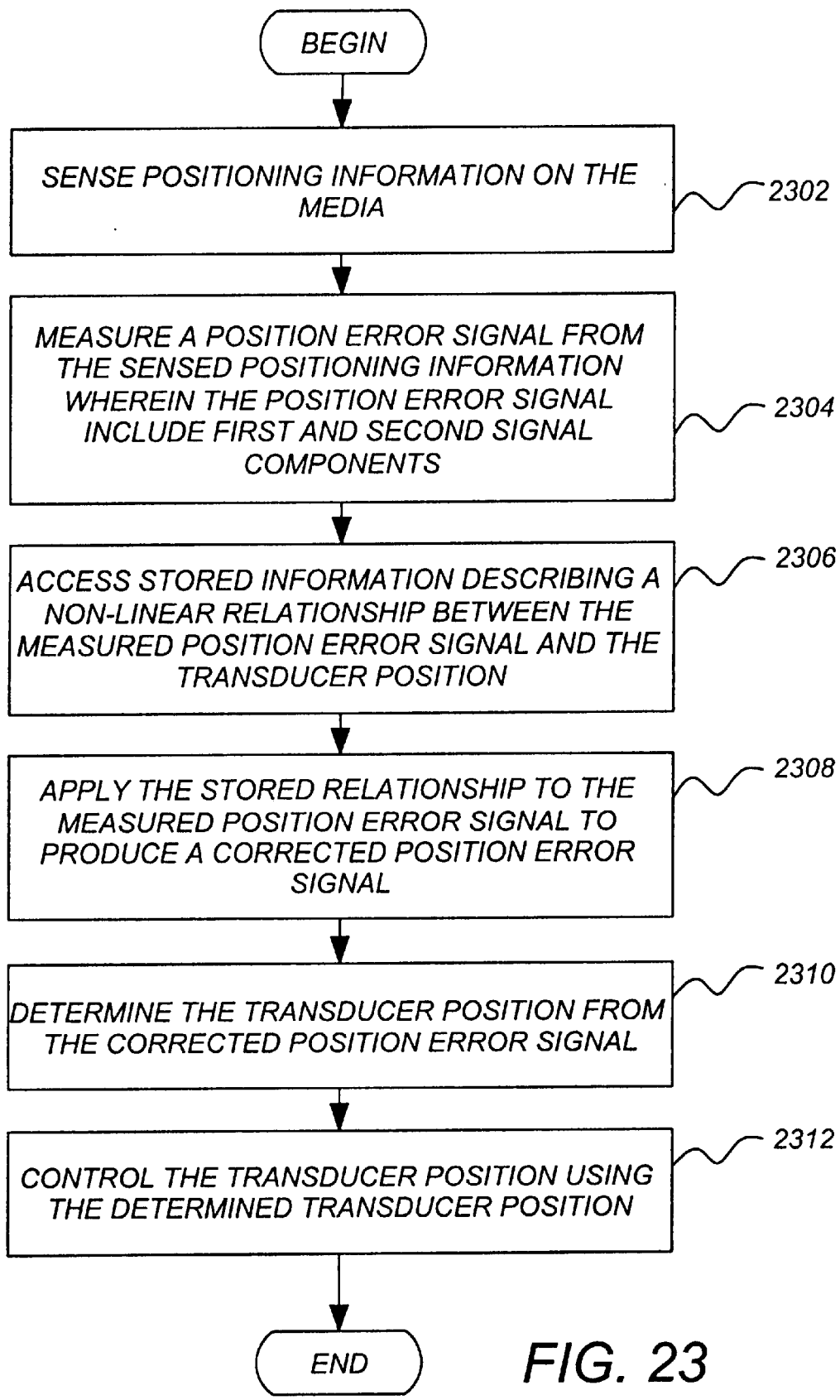
FIG. 23 is a flow chart presenting exemplary process steps for using the relationship between the measured PES signal and the read transducer position to determine the transducer position in relation to the media surface.

FIG. 23 is a flow chart presenting exemplary process steps for using the relationship between the measured PES signal and the read transducer 602 position to determine the transducer position in relation to the media surface, and for using that information to control the read transducer 602.

First, the positioning information on the media is sensed, as shown in block 2302. using the sensed position information, a position error signal (PES) is measured to generate $\text{PES}_{measured}$, as shown in block 2304. The PES includes first and a second position signal components such as the A burst 504 and the C burst 508. Next, stored information describing a non-linear relationship between the measured position error signal $\text{PES}_{measured}$ and the read transducer 602 position is accessed 2306. This information may be retrieved from the storage media itself in a reserved area, in an ASIC, the disk drive controller, in a non-volatile or volatile memory within other disk drive electronics, or in a memory in a computer card accessible to the disk drive.

The relationship between the measured position error signal and the read transducer position 602 reflects the measurements described above, which account for read head sensitivity non-linearities, read head with variations, and other factors. Consequently, this relationship is a non-linear function in the sense that the relationship between the measured position error signal and the read transducer position is not described merely by a simple gain.

In one embodiment of the invention, the stored relationship implemented in a table look-up, with linear or non-linear interpolation between data points. In another embodiment, the stored relationship comprises coefficients of a second order polynomial of the form of equation (21)–(25) above.

Next, the accessed stored relationship is applied to the measured position error signal $PES_{measured}$, and a corrected position error signal $PES_{corrected}$, by stitching together the measured PESP and PESQ signals using the techniques described above. This is illustrated in block 2308. This corrected signal used to determine and control the read transducer 602 position, as shown in blocks 2310 and 2312.

As can be seen in FIG. 22, even after applying the accessed stored relationship, the corrected position error signal may be in error 2214 at the quarter track position. As described above, these errors manifest themselves as discontinuities in the composite PES, resulting in undesired servo behavior.

The present invention provides the system designer with alternative methods of dealing with such discontinuities. In one embodiment of the present invention, these discontinuities are not accounted for in the stored relationship. Instead, they are reduced by applying the normalization techniques described above. However, if normalization is applied across the entire ±¼ track area, the accuracy of the position error signal near the zero track position may well be compromised.

In another embodiment of the present invention, the function $p=f(PES_{measured})$ is constrained to minimize discontinuities, essentially performing some normalization as a part of the linearization process. Accordingly, the function $p=f(PES_{measured})$ may be constrained in several ways. For example, the $f(PES_{measured})$ function can be changed to substantially eliminate the discontinuities by modifying or constraining $f(PES_{measured})$ at the ¼ track position to be equal to 0.25. This is illustrated in blocks 1106–1110 of FIG. 11. This helps to reduce discontinuities that may occur when the PES signal is stitched together from the PESP and PESQ signals. However, it should be noted that adding this additional constraint reduces the match between $f(PES_{measured})$ and the measured data, and hence, will introduce new, albeit second order, non-linearities into the composite PES. Also, since errors other than read transducer 602 width variations contribute to discontinuities, it may be advisable to perform the normalization routines, even when the function $f(PES_{measured})$ is constrained at the quarter track points. If desired, the quarter track constraint can be imposed by applying the normalization algorithms described above to the PES measurements taken during the calibration process to assure that the measured value (before curve fitting) at the quarter track positions is 0.25.

The function $f(PES_{measured})$ may also be constrained such that it passes through the origin when the offtrack position is zero (i.e. when $f(0)=0$). This assures that a zero value will result when the read transducer 602 is at the zero track position, thus eliminating offset errors. Ordinarily, this constraint should be used when the different curve fits or inverse curve fits are used for the positive and negative offtrack positions, as described in equations (22) through (25) to assure that the curves properly meet at the origin.

Figure 24:
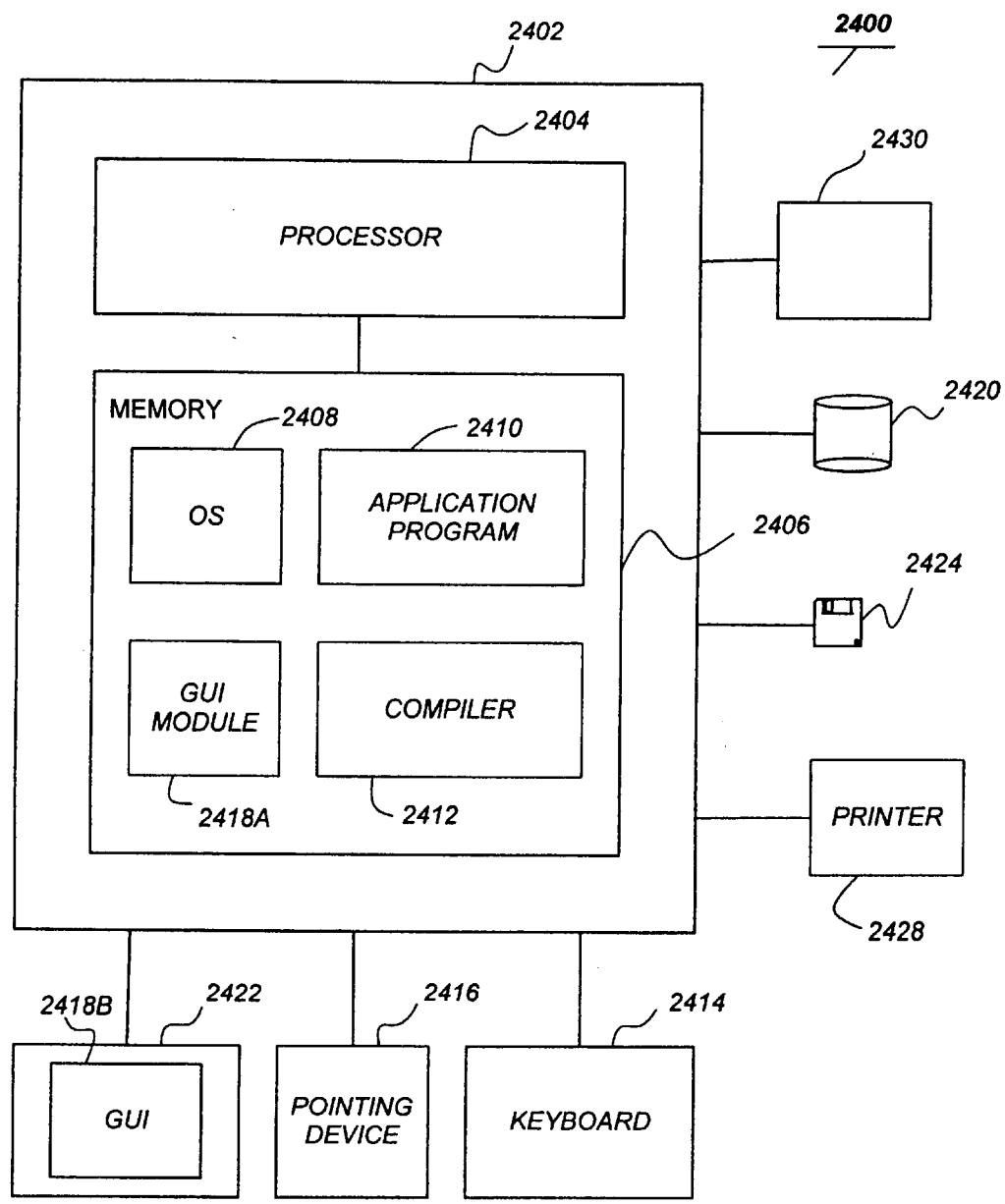
FIG. 24 is a block diagram of an exemplary computer system that can be used with the disk drive or to implement the auxiliary discontinuity removal routine.

FIG. 24 illustrates an exemplary computer system 2400 that could be used to implement the invention described herein. The computer system comprises a computer 2402 having a processor 2404 and a memory, such as random access memory (RAM) 2406. The computer 2402 is operatively coupled to a display 2422, which presents images such as windows to the user on a graphical user interface 2418B. The computer 2402 may be coupled to other devices, such as a keyboard 2414, a mouse device 2416, a printer, etc. Of course, those skilled in the art will recognize that any combination of the above components, or any number of different components, peripherals, and other devices, may be used with the computer 2402.

Generally, the computer 2402 operates under control of an operating system 2408 stored in the memory 2406, and interfaces with the user to accept inputs and commands and to present results through a graphical user interface (GUI) module 2418A. Although the GUI module 2418A is depicted as a separate module, the instructions performing the GUI functions can be resident or distributed in the operating system 2408, the computer program 2410, or implemented with special purpose memory and processors. The computer 2402 may also implement a compiler 2412 which allows an application program 2410 written in a programming language such as COBOL, C++, FORTRAN, or other language to be translated into processor 104 readable code. After completion, the application 2410 accesses and manipulates data stored in the memory 2406 of the computer 2402 using the relationships and logic that was generated using the compiler 2412. The computer 2402 also optionally comprises an external communication device such as a modem, satellite link, Ethernet card, or other device for communicating with other computers.

In one embodiment, instructions implementing the operating system 2408, the computer program 2410, and the compiler 2412 are tangibly embodied in a computer-readable medium, e.g., data storage device 2420, which could include one or more fixed or removable data storage devices, such as a zip drive, floppy disc drive 2424, hard drive, CD-ROM drive, tape drive, etc. Further, the operating system 2408 and the computer program 2410 are comprised of instructions which, when read and executed by the computer 2402, causes the computer 2402 to perform the steps necessary to implement and/or use the present invention. Computer program 2410 and/or operating instructions may also be tangibly embodied in memory 2406 and/or data communications devices, thereby making a computer program product or article of manufacture according to the invention. As such, the terms "article of manufacture" and "computer program product" as used herein are intended to encompass a computer program accessible from any computer readable device or media, including memory structures used in the computer subsystems such as a hard drive controller.

Conclusion

This concludes the description of the preferred embodiments of the present invention. In summary, the present invention describes a method, apparatus, and an article of manufacture for determining a transducer position in relation to a media surface.

The method comprises the steps of sensing positioning information on the media, measuring a position error signal from the sensed positioning information wherein the position error signal includes first and second position signal components, accessing stored information describing a non-linear relationship between the measured position error signal and the transducer position, and applying the stored relationship to the measured position error signal to produce a corrected position error signal, and determining the transducer position from the corrected position error signal. The apparatus comprises a means for performing the operations described above, and a program storage device tangibly embodying instructions for performing the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of determining a transducer position in relation to a media surface, comprising the steps of:

sensing positioning information on the media;

measuring a position error signal from the sensed positioning information wherein the position error signal includes first and second position signal components;

accessing stored information describing a non-linear relationship between the measured position error signal ($PES_{measured}$) and the transducer position, wherein the non-linear relationship is described by a function $p=f$ ($PES_{measured}$) wherein p is the read transducer position and the function $p=f(PES_{measured})$ is constrained so that $f(a)=\alpha$ where $\alpha$ corresponds to a stitch point, applying the stored relationship to the measured position error signal ($PES_{measured}$) to produce a corrected position error signal; and determining the transducer position from the corrected position error signal.

2. The method of claim 1, wherein the function $f$ is curve-fitted and constrained so that $f(0)=0$.

3. The method of claim 1, wherein the function $f$ is a polynomial in $PES_{measured}$.

4. The method of claim 3, wherein the polynomial in $PES_{measured}$ is a second order polynomial.

5. The method of claim 1, wherein the function $p=f$ ($PES_{measured}$) is described according to $p=f_1(PES_{measured})$ when $PES_{measured} \geq 0$ and $p=-f_3(-PES_{measured})$ otherwise.

6. The method of claim 1, wherein the function $p=f$ ($PES_{measured}$) is described according to $p=f_1(PES_{measured})$ when $PES_{measured} \geq 0$ and $p=f_2(PES_{measured})$ otherwise.

7. The method of claim 1, further comprising the step of controlling the transducer position according to the determined transducer position.

8. The method of claim 1, wherein the stored relationship is read from a non-volatile memory.

9. The method of claim 1, wherein the stored relationship is read from the media surface.

10. The method of claim 1, further comprising the step of:

normalizing the corrected position error signal according to a pre-determined algorithm to produce a normalized transducer position signal; and correcting discontinuities in the corrected position error signal at at least one stitch point using the normalized transducer position error signal, wherein the normalized transducer position error signal is produced by stitching together first and second position signal components.

11. An apparatus for determining a transducer position in relation to a media surface, comprising:

means for sensing positioning information on the media;

means for measuring a position error signal from the sensed positioning information wherein the position error signal includes first and second position signal components;

means for accessing stored information describing a non-linear relationship between the measured position error signal ($PES_{measured}$) and the transducer position, where the non-linear relationship is described by a function $p=f(PES_{measured})$ wherein p is the read transducer position and the function $p=f(PES_{measured})$ is constrained so that $f(a)=\alpha$ where $\alpha$ corresponds to a stitch point;

means for applying the stored relationship to the measured position error signal ($PES_{measured}$) to produce a corrected position error signal; and determining the transducer position from the corrected position error signal.

12. The apparatus of claim 11, wherein the function $f$ is curve-fitted and constrained so that $f(0)=0$.

13. The apparatus of claim 11, wherein the function $f$ is a polynomial in $PES_{measured}$.

14. The apparatus of claim 13, wherein the polynomial in $PES_{measured}$ is a second order polynomial.

15. The apparatus of claim 11, wherein the function $p=f(PES_{measured})$ is described according to $p=f_1(PES_{measured})$ when $PES_{measured} \geq 0$ and $p=-f_1(-PES_{measured})$ otherwise.

16. The apparatus of claim 11, wherein the function $p=f(PES_{measured})$ is described according to $p=f_1(PES_{measured})$ when $PES_{measured} \geq 0$ and $p=f_2(PES_{measured})$ otherwise.

17. The apparatus of claim 11, further comprising the step of controlling the transducer position according to the determined transducer position.

18. The apparatus of claim 11, wherein the stored relationship is read from a non-volatile memory.

19. The apparatus of claim 11, wherein the stored relationship is read from the media surface.

20. The apparatus of claim 11, further comprising:

means for normalizing the corrected position error signal according to a pre-determined algorithm to produce a normalized transducer position signal; and means for correcting discontinuities in the corrected position error signal at at least one stitch point using the normalized transducer position error signal, wherein the normalized transducer position error signal is produced by stitching together first and second position signal components.

21. A program storage device, readable by a computer, tangibly embodying at least one program of instructions executable by the computer to perform method steps of determining a transducer position in relation to a media surface, the method steps comprising the steps of:

sensing positioning information on the media;

measuring a position error signal from the sensed positioning information wherein the position error signal includes first and second position signal components;

accessing stored information describing a non-linear relationship between the measured position error signal ($PES_{measured}$) and the transducer position, wherein the non-linear relationship is described by a function $p=f$ ($PES_{measured}$) wherein p is the read transducer position and the function $p=f(PES_{measured})$ is constrained so that $f(a)=\alpha$ where $\alpha$ corresponds to a stitch point;

applying the stored relationship to the measured position error signal ($PES_{measured}$) to produce a corrected position error signal; and determining the transducer position from the corrected position error signal.

22. The program storage device of claim 21, where the function $f$ is curve-fitted and constrained so that $f(0)=0$.

23. The program storage device of claim 21, wherein the function $f$ is a polynomial in $PES_{measured}$.

24. The program storage device of claim 23, wherein the polynomial in $PES_{measured}$ is a second order polynomial.

25. The program storage device of claim 21, wherein the function $p=f(PES_{measured})$ is described according to $p=f_1(PES_{measured})$ when $PES_{measured} \geq 0$ and $p=-f_1(-PES_{measured})$ otherwise.

26. The program storage device of claim 21, wherein the function $p=f(PES_{measured})$ is described according to $p=f_1(PES_{measured})$ when $PES_{measured} \geq 0$ and $p=f_2(PES_{measured})$ otherwise.

27. The program storage device of claim 21, wherein the method steps further comprise the step of controlling the transducer position according to the determined transducer position.

28. The program storage device of claim 21, wherein the stored relationship is read from a non-volatile memory.

29. The program storage device of claim 21, wherein the stored relationship is read from the media surface.

30. The program storage device of claim 21, wherein the method steps further comprises the method steps of:

normalizing the corrected position error signal according to a pre-determined algorithm to produce a normalized transducer position signal; and correcting discontinuities in the corrected position error signal at at least one stitch point using the normalized transducer position error signal, wherein the normalized transducer position error signal is produced by stitching together first and second position signal components.

* * * * *

UNITED STATES PATENT AND TRADEMARK OFFICE
CERTIFICATE OF CORRECTION

PATENT NO. : 6,522,493 B1
DATED : February 18, 2003
INVENTOR(S) : Jeff J. Dobbek et al.

It is certified that error appears in the above-identified patent and that said Letters Patent is hereby corrected as shown below:

Column 21,
Line 44, "3" should read -- 1 --

Column 22,
Line 7, "where" should read -- wherein --
Lines 31-32, "the step of" should read -- means for --

Signed and Sealed this

Twenty-sixth Day of August, 2003

JAMES E. ROGAN
*Director of the United States Patent and Trademark Office*